(12) United States Patent
Sedin et al.

(10) Patent No.: US 12,446,036 B2
(45) Date of Patent: Oct. 14, 2025

(54) EFFICIENT BUFFER STATUS REPORTING OVER 2-STEP RA

(71) Applicant: Telefonaktiebolaget LM Ericsson (publ), Stockholm (SE)

(72) Inventors: Jonas Sedin, Sollentuna (SE); Jan Christoffersson, Luleå (SE); Henrik Enbuske, Stockholm (SE); Zhipeng Lin, Nanjing (CN); Johan Rune, Lidingö (SE); Björn Hofström, Linköping (SE); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 828 days.

(21) Appl. No.: 17/765,474

(22) PCT Filed: Oct. 1, 2020

(86) PCT No.: PCT/EP2020/077605
§ 371 (c)(1),
(2) Date: Mar. 31, 2022

(87) PCT Pub. No.: WO2021/064150
PCT Pub. Date: Apr. 8, 2021

(65) Prior Publication Data
US 2022/0369368 A1 Nov. 17, 2022

Related U.S. Application Data

(60) Provisional application No. 62/910,258, filed on Oct. 3, 2019.

(51) Int. Cl.
*H04W 72/20* (2023.01)
*H04W 72/1268* (2023.01)
(Continued)

(52) U.S. Cl.
CPC ....... *H04W 72/20* (2023.01); *H04W 72/1268* (2013.01); *H04W 72/23* (2023.01);
(Continued)

(58) Field of Classification Search
CPC ........... H04W 74/085; H04W 72/1268; H04W 72/20; H04W 72/23; H04W 74/0866; H04W 74/0836; H04W 74/0833
See application file for complete search history.

(56) References Cited

U.S. PATENT DOCUMENTS

2017/0215160 A1* 7/2017 Löhr ..................... H04W 76/14
2018/0124824 A1* 5/2018 Lee ..................... H04W 74/002
(Continued)

FOREIGN PATENT DOCUMENTS

CN 102170677 A * 8/2011
WO 2018127244 A1 7/2018

OTHER PUBLICATIONS

Chen et al. "Method, System and Device for Transmitting Request Messages"; Aug. 31, 2011, CN, CN 102170677 (Year: 2011).*
(Continued)

*Primary Examiner* — Michael K Phillips
(74) *Attorney, Agent, or Firm* — COATS & BENNETT, PLLC

(57) ABSTRACT

Buffer Status Reports (BSR), by which the network is made aware of uplink transmission needs of wirless devices, are specifically enabled to be transmitted using 2-step Random Access (RA), to reduce latency and network resource use. In one embodiment, 2-step RA configurations tailored to BSR-transmissions are introduced. These may, for example, use a subset of the configured resources in the configured 2-step RA resources for BSR. In another embodiment, conditions for triggering BSR over 2-step RA, depending on the traffic, are introduced. For example, the priority or the the delay
(Continued)

budget of the traffic may be used to determine whether a BSR over 2-step RA should be triggered. In another embodiment, simplified procedures when receiving the response to MsgA are introduced. These may include, for example, not transmitting a full MsgB, but rather having the UE receive an UL grant.

20 Claims, 15 Drawing Sheets

(51) Int. Cl.
  *H04W 72/23* (2023.01)
  *H04W 74/08* (2009.01)
  *H04W 74/0836* (2024.01)
  *H04W 74/0833* (2024.01)
(52) U.S. Cl.
  CPC ... *H04W 74/0836* (2024.01); *H04W 74/0866* (2013.01); *H04W 74/0833* (2013.01); *H04W 74/085* (2013.01)

(56) References Cited

U.S. PATENT DOCUMENTS

| | | | |
|---|---|---|---|
| 2018/0368012 A1 | 12/2018 | Wei et al. | |
| 2019/0320467 A1* | 10/2019 | Freda | H04W 74/004 |
| 2019/0350004 A1 | 11/2019 | Zhao et al. | |
| 2020/0008188 A1* | 1/2020 | Nam | H04W 74/02 |
| 2020/0100297 A1* | 3/2020 | Agiwal | H04B 17/318 |
| 2020/0107369 A1* | 4/2020 | Jeon | H04W 74/006 |
| 2021/0329703 A1* | 10/2021 | Yang | H04B 17/318 |
| 2022/0116999 A1* | 4/2022 | Xiong | H04W 74/006 |

OTHER PUBLICATIONS

Intel Corporation, "Channel structure for two-step RACH", Feb. 25, 2019-Mar. 1, 2019, 3GPP, R1-1902466 (Year: 2019).*
CMCC, "Discussion of MsgA content for different cases", May 13, 2019-May 17, 2019, 3GPP, R1-1905920 (Year: 2019).*
3rd Generation Partnership Project, "Technical Specification Group Radio Access Network; Study on NR-based access to unlicensed spectrum (Release 16)", 3GPP TR 38.889 V16.0.0, Dec. 2018, pp. 1-163.
Thales, "Study on solutions evaluation for NR to support Non Terrestrial Network", 3GPP TSG RAN meeting #80, Jun. 11-14, 2018, pp. 1-5, La Jolla, US, RP-181370.
ZTE Corporation et al., "New work item 2-step RACH for NR", 3GPP TSG RAN Meeting #82, Dec. 10-13, 2018, pp. 1-5, Sorrento, Italy, RP-182894.
3rd Generation Partnership Project, "Technical Specification Group Radio Access Network;Study on New Radio (NR) to support non-terrestrial networks (Release 15)", 3GPP TR 38.811 V15.2.0, Sep. 2019, pp. 1-128.
3rd Generation Partnership Project, "Technical Specification Group Radio Access Network; NR; Medium Access Control (MAC) protocol specification (Release 15)", 3GPP TS 38.321 V15.7.0, Sep. 2019, pp. 1-78.
CMCC, "Discussion of MsgA content for different cases", 3GPP TSG-RAN WG2 Meeting #106, May 13-17, 2019, pp. 1-5, Reno, US, R2-1905920.
Apple, Inc., "On Procedure for 2-step RACH", 3GPP TSG RAN WG1 #98, Aug. 26-30, 2019, pp. 1-4, Prague, CZ, R1-1909041.
Intel Corporation, "Channel structure for two-step RACH", 3GPP TSG RAN WG1 #96, Feb. 25-Mar. 1, 2019, pp. 1-8, Athens, Greece, R1-1902466.

* cited by examiner

PUSCH Occasion

| PUSCH RU: $\{DMRS_{k,0}\}, \{DMRS_{k,1}\}$ |
|---|

EFFICIENT BUFFER STATUS REPORTING OVER 2-STEP RA

RELATED APPLICATIONS

This application claims priority to U.S. Provisional Patent Application Ser. No. 62/910,258 filed Oct. 3, 2019, the entire contents of which are incorporated herein by reference.

TECHNICAL FIELD

The present invention relates generally to wireless communication, and in particular to systems and methods for efficiently transmitting a Buffer Status Request using a 2-step Random Access Procedure.

BACKGROUND

Wireless communication networks, including network nodes and radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

The basic network model—often called "cellular"—comprises a number of fixed network nodes with radio communication circuitry, called base stations, providing communication services across an air interface over a fixed geographic area, called a "cell." The base stations communicate with a large number of fixed and mobile terminals, collectively known as User Equipment (UE). In various network generations, a base station may be referred to as a Node-B (NB), enhanced Node-B (eNB), or next generation Node-B (gNB). Each eNB/gNB connects to numerous other nodes in the Core Network (CN), which perform various functions such as mobility management, authentication and billing, connections to other networks such as the Internet, and the like. Transmissions from the UE to the eNB/gNB are called uplink (UL); those from the network to the UE are called downlink (DL). The eNBs/gNBs, UEs, and the air interface are collectively known as the Radio Access Network (RAN).

Most of the technical specifications for 5G have been defined by the Third Generation Partnership Project (3GPP). 5G wireless access will be realized by the evolution of Long Term Evolution (LTE) for existing spectrum, in combination with new radio access technologies (RAT) that primarily target new spectrum. Thus, it includes work on a 5G New Radio (NR) Access Technology, also known as next generation (NX). The NR air interface targets spectrum in the range from below 1 GHz up to 100 GHZ, with initial deployments expected in frequency bands not utilized by LTE. Some LTE terminology may be used in this disclosure in a forward looking sense, to include equivalent 5G entities or functionalities, although a different term is or may eventually be specified in 5G.

In addition to expanded bandwidth and higher bitrates to enrich User Equipment (UE) experience, the 5G NR technology will include expanded support for machine-to-machine (M2M) or machine type communications (MTC), variously known as the Networked Society or Internet of Things (IoT). Accordingly, use of the term "UE" herein is synonymous with "wireless device," and specifically includes wireless devices that have no "user." Although some M2M communications are anticipated to be intermittent, delay-tolerant, and low bandwidth, such as utility meter reading and similar status-reporting type applications, other anticipated applications will require very low latency—indeed, near-real-time, such as autonomous vehicle control. For these applications, 3GPP has defined Ultra-Reliable Low-Latency Communications (URLLC), having <1 ms latency. Reduced latency is also a requirement for many modes of service to conventional UEs such as smartphones, such as high resolution video conferencing, interactive gaming, and the like. Accordingly, reducing latency in all aspects of wireless communication network operation stands as one major challenge in 5G systems and beyond.

Latency reduction becomes particularly important in expanded applications of NR. As discussed above, NR targets spectrum in frequency bands much higher than those utilized by LTE. Much of this spectrum is unlicensed, which introduces restrictions that increase latency. One of these is that a device (e.g. a base station or a UE) must monitor the shared medium, i.e., the air interface channel, and determine that it is free (not being used by any other device) before starting to transmit on the channel. This procedure is referred to as Listen-Before-Talk (LBT) or Clear Channel Assessment (CCA). In this mechanism, a radio device performs energy detection (ED) on the channel over a time period. The channel is determined to be idle—meaning transmission can proceed—if the detected energy is less than an energy detection threshold (ED threshold) over a predetermined duration. The device may proceed to transmit on an idle channel. If the channel is determined to be occupied, the transmitter performs a random back-off before again attempting to access the channel. Clearly, the more times radio devices must perform LBT, the greater the latency introduced into the communication.

The application of LTE and NR technologies to non-terrestrial networks (NTNs), such as satellite networks, is also being investigated. Satellites are deployed in a variety of orbits, often classified by their altitudes. Even in Low Earth Orbit (LEO), satellite communications incur significantly greater propagation delays than do terrestrial networks, which obviously deleteriously affects latency.

Whether the network is terrestrial or an NTN, and whether in licensed or unlicensed spectrum, when a UE first enters service (e.g., powers on, or exits "airplane mode"), it must engage in a process of discovery, synchronization, and network access (including authentication and registration by the network). Because the UE initially is not synchronized to the network, and can initiate network access at any time (a random time, from the network's perspective), the initial phase of the registration process is referred to as Random Access (RA).

Conventionally (e.g., in LTE systems), RA is a 4-step process, as illustrated in FIG. 1. The UE first detects synchronization signals (SS) and system information periodically broadcast by the network. The UE decodes the broadcasted system information, then transmits a Physical Random Access Channel (PRACH) preamble (referred to as message 1, or msg1) in the uplink. The network replies with a Random Access Response (RAR), msg2, which includes timing and UL resource information (as indicated, this could be from multiple base stations that received the msg1). The UE then sends a Connection Request message, msg3, on the Physical Uplink Shared Channel (PUSCH) to a specific base station, according to the UL information it received in msg2.

The network then sends a Contention Resolution Message, msg4, to the UE to resolve possible contention between UEs performing RA.

In NR (3GPP Release 15 and 16), a 2-step RA procedure is defined, as illustrated in FIG. 2. In this procedure, a UE receives broadcast synchronization and system information, as in the 4-step RA. The UE then sends both an RA preamble on PRACH, and higher layer data (e.g., a Connection Request) on PUSCH, both referred to as message A (MsgA). The network responds with an RAR, called message B (MsgB), which may include information such as a UE identifier, timing advance, contention resolution, and the like.

Once a UE is connected to the network, it informs the network of uplink data in its buffers—and hence the need for uplink resources to transmit it—by sending a Buffer Status Report (BSR). If the UE cannot add a BSR to a current uplink allocation, it must request new uplink resource from the network by sending a Scheduling Request (SR). SR is sent on a Physical Uplink Control Channel (PUCCH) on configured SR resources, specified by the network in an SR configuration. Each SR configuration consists of a set of PUCCH resources for SR across different Bandwidth Parts (BWP) and cells. If a UE has SR resources configured, they must be used (See 3GPP TS 38.321). If the UE does not have PUCCH resources configured for SR, it triggers an RA procedure.

Thus, the typical UL procedure proceeds as follows. UL data arrives at the UE (e.g., a user speaks into a cellphone, types a text message or email into a smartphone, an M2M type device performs measurements or is triggered to request data, or the like). If no UL resources are available, the UE triggers a SR. The network responds with an UL grant sufficient for the UE to transmit the BSR. Upon receiving the BSR, the network is aware of the UE's uplink data situation (size, priority, etc.), and sends an appropriate UL grant to the UE.

In unlicensed spectrum, this procedure requires two LBTs. In a NTN, it requires at least two RTTs. In both cases, severe delays are imposed between UL data becoming available at the UE and the UE being able to transmit it. It is possible to include BSR in the MsgA transmission of 2-step RA. This may also be required when a UE in connected mode needs to do 2-step RA for regaining uplink synchronization. Accordingly, it would be beneficial to separate the 2-step RA resources. Furthermore, in case the UE has SR resources configured, the option of using random access does not exist when an SR is triggered. As discussed above, if SR resources are configured, these must be used (See 3GPP TS 38.321).

The Background section of this disclosure is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, BSR is enabled to transmitted on 2-step RA in an efficient manner. In one embodiment, 2-step RA configurations specifically tailored to BSR-transmissions are introduced. These may, for example, use a subset of the configured resources in the configured 2-step RA resources for BSR. In another embodiment, conditions for triggering BSR over 2-step RA, depending on the traffic, are introduced. For example, the priority or the the delay budget of the traffic may be used to determine whether a BSR over 2-step RA should be triggered. In another embodiment, simplified procedures when receiving the response to MsgA are introduced. These may include, for example, not transmitting a full MsgB, but rather having the UE receive an UL grant.

One embodiment relates to a method, performed by a wireless device operative in a wireless communication network, of buffer status reporting. One or more configurations specifically for sending a Buffer Status Report (BSR) using a 2-step Random Access (RA) procedure are obtained from the network. A BSR is transmitted to the network in a MsgA of a 2-step RA.

Another embodiment relates to a wireless device operative in a wireless communication network. The wireless device includes communication circuitry configured to wirelessly communicate with one or more nodes of the wireless communication network, and processing circuitry operatively connected to the communication circuitry. The processing circuitry is configured to cause the wireless device to obtain, from the network, one or more configurations specifically for sending a Buffer Status Report (BSR) using a 2-step Random Access (RA) procedure; and transmit to the network a BSR in a MsgA of a 2-step RA.

Yet another embodiment relates to a method, performed by a base station operative in a wireless communication network, of receiving buffer status reporting from a wireless device with low latency. One or more wireless devices in a cell are configured with 2-step Random Access (RA) resources specifically for use in Buffer Status Reporting (BSR). A BSR in a MsgA of a 2-step RA is received from a wireless device.

Still another embodiment relates to a base station operative in a wireless communication network. The base station includes communication circuitry configured to wirelessly communicate with one or more wireless devices and processing circuitry operatively connected to the communication circuitry. The processing circuitry is configured to cause the base station to configure one or more wireless devices in a cell with 2-step Random Access (RA) resources specifically for use in Buffer Status Reporting (BSR) and receive from a wireless device a BSR in a MsgA of a 2-step RA.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Some network procedures and specifications briefly summarized in the Background are presented in greater detail below, with reference to the relevant 3GPP standards and publications.

4 Step RA Procedure in NR

Figure 1:
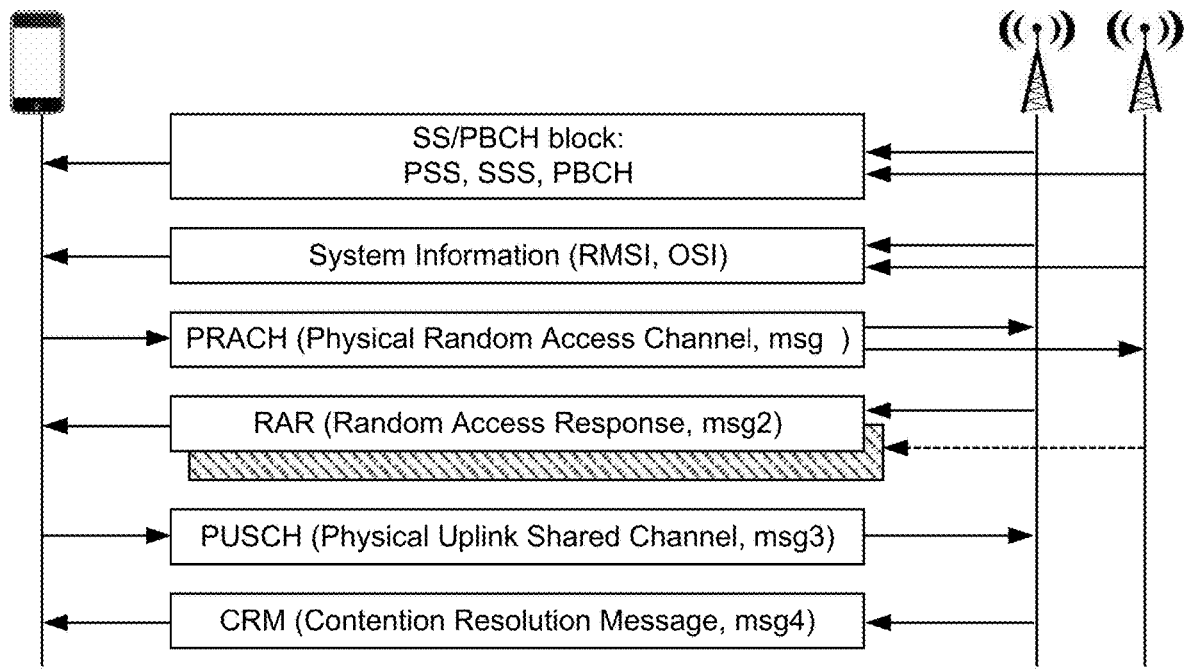
FIG. 1 is a signaling diagram of a 4-step Random Access procedure.

A 4-step approach is used for the random-access procedure, see FIG. 1. In this approach, the UE detects synchronization signals (SS) and decodes the broadcasted system information, followed by transmitting a Physical Random Access Channel (PRACH) preamble (message 1) in the uplink. The gNB replies with an RAR (Random Access Response, message 2). The UE then transmits a UE identification (message 3) on the Physical Uplink Shared Channel (PUSCH).

The UE transmits message 3 (on PUSCH) after receiving a timing advance command in the RAR, allowing PUSCH to be received with a timing accuracy within the cyclic prefix. Without this timing advance, a very large CP would be needed in order to be able to demodulate and detect PUSCH, unless the system is applied in a cell with very small distance between UE and eNB. Since NR will also support larger cells with a need for providing a timing advance to the UE the 4-step approach is needed for random access procedure.

2-Step RACH Work Item for Release 16 in 3GPP

A 2-step RACH work item has been approved in RAN1 #82 plenary meeting. See RP-182894, New work item proposal 2 step RACH for NR, ZTE, Sorrento, Italy, Dec. 10-13, 2018, the disclosure of which is incorporated herein by reference in its entirety.

Figure 2:
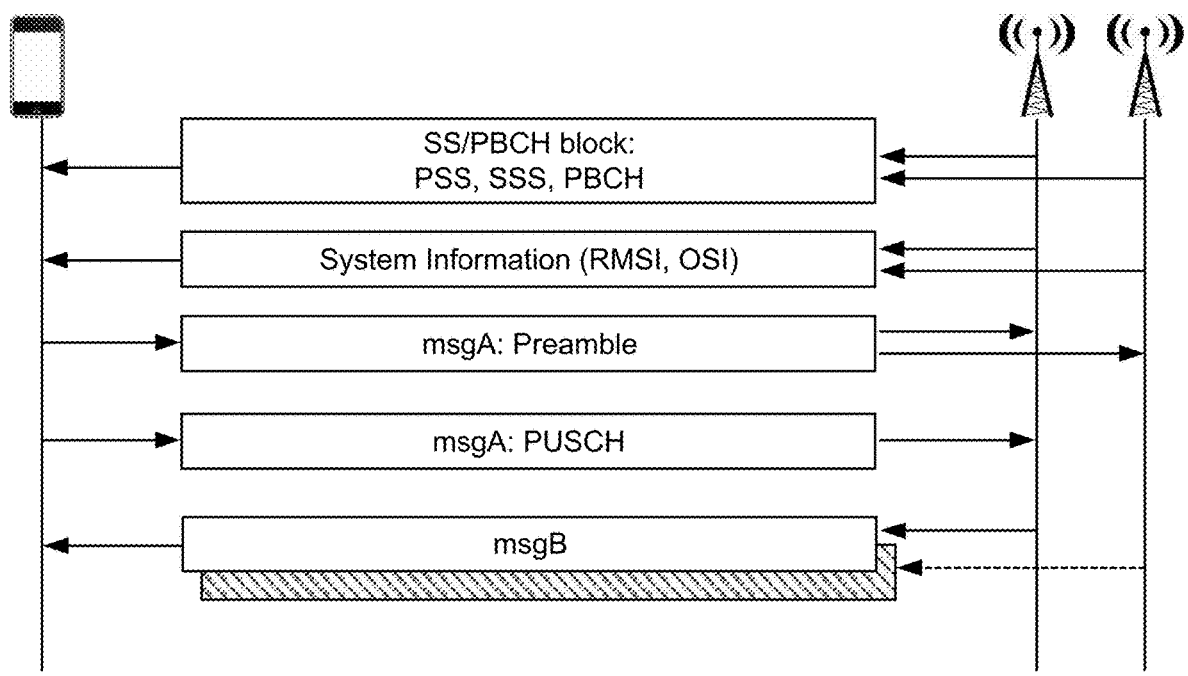
FIG. 2 is a signaling diagram of a 2-step Random Access procedure.

The initial access is completed in only two steps as illustrated in FIG. 2:

Step 1: The UE sends a message a including random access preamble, together with higher layer data such as RRC connection request, and possibly with some small payload, on PUSCH;

Step 2: The gNB sends RAR (actually called message B) including UE identifier assignment, timing advance information, and contention resolution message, etc. In addition, message B (MsgB) may contain a higher layer part, e.g., an RRC message, which probably will be transmitted in a separate transmission from the RAR (see below).

Note that the definition of MsgB is somewhat very vague, and it may be subject to further changes in RAN2. The current status from RAN2 is that MsgB is a response to MsgA, which may contain contention resolution message(s), fallback indication(s) to schedule Msg3 transmission, and backoff indication. Any higher layer information, e.g., corresponding to the content of msg4 in 4-step RA, would thus be transmitted in separate message(s). However, at the time of this disclosure, the definition of MsgB is subject to change. Accordingly, the term is functionally defined herein, and those of skill in the art can readily map the discussion of MsgB content herein to any future definition/specification of MsgB in 3GPP standards.

MsgA PUSCH Resource Allocation

When introducing the 2-step random access procedure, the PUSCH in MsgA can be transmitted immediately after an associated RACH preamble. The MsgA PUSCH resources are cell-specifically reserved, at least for the initial transmission of MsgA PUSCH.

Figures 3, 5:
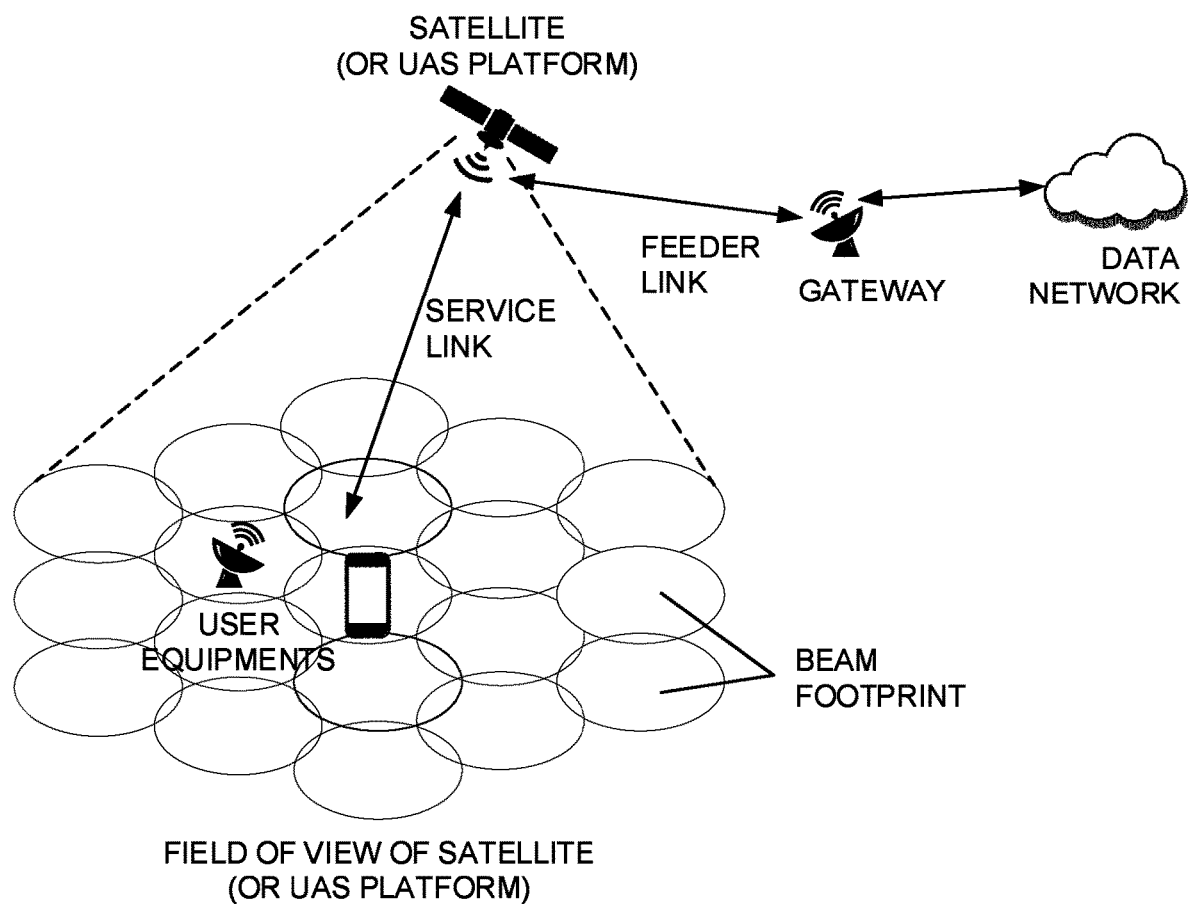
FIG. 3 is a block diagram of a PUSCH Occasion.
FIG. 5 is a diagram of a non-terrestrial communication network.

MsgA PUSCH may be transmitted in time/frequency resource locations referred to as PUSCH occasions (PO), as shown in FIG. 3.

Figure 4:
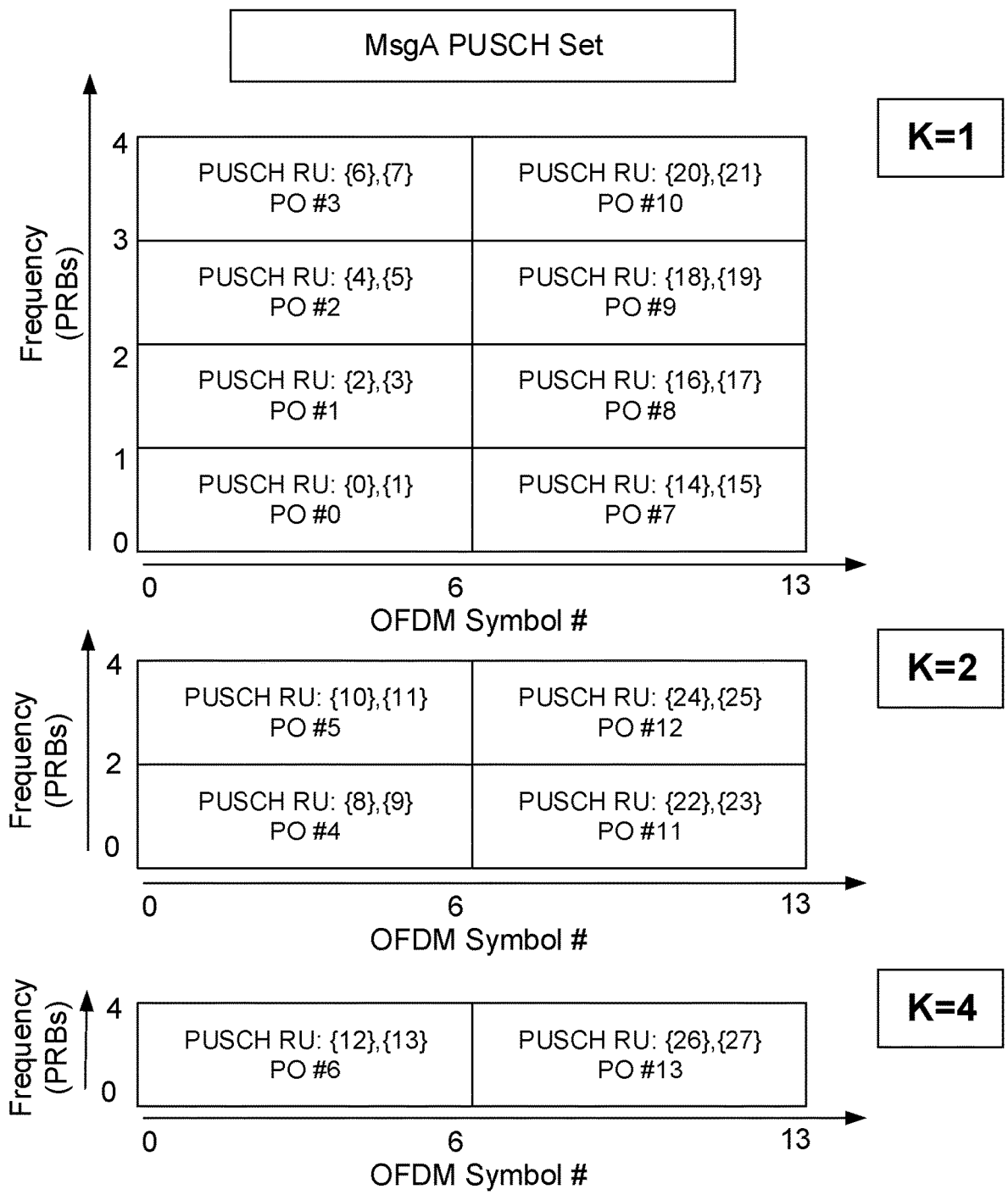
FIG. 4 depicts examples of MsgA PUSCH Sets for various values of K (indicating the number of PRBs per PUSCH RU.

FIG. 4 depicts sets of resources containing multiple PUSCH occasions, referred to herein as a 'MsgA PUSCH set'. In each MsgA PUSCH set, A PUSCH Resource Unit ('PUSCH RU') is defined as the PUSCH occasion ('PO') and DMRS port/DMRS sequence used for MsgA payload transmission.

Allows MU-MIMO reception

FFS: support of both DMRS port & sequence or just one

Each PUSCH RU occupies a contiguous set of subcarriers and symbols

FFS: If for each PO there is a guard band (in PRBs) or guard time

A MsgA PUSCH set occurs periodically and has a known length in symbols and position in frequency A MsgA PUSCH set can contain multiple POs contiguous in frequency and in time (including guard band or period if defined)

FFS: Support for frequency hopping

PUSCH RUs have 'K' PRBs. K can vary, and a given PRB can contain PUSCH RUs with different size. K is identified by which preamble is used. If a PRB contains PUSCH RUs with different size K, DMRS IDs are a function of size; Total #DMRS=(#PO Sizes)×(PUSCH RUs per PO). UE can randomly select PUSCH RU index 'n' out of the configured set.

Non-Terrestrial Networks

To benefit from the strong mobile ecosystem and economy of scale, adapting the terrestrial wireless access technologies including LTE and NR for satellite networks is drawing significant interest. For example, 3GPP completed an initial study in Release 15 on adapting NR to support non-terrestrial networks (NTN), mainly satellite networks. See TR 38.811, "Study on New Radio (NR) to support non-terrestrial networks," the disclosure of which is incorporated herein by reference in its entirety. This initial study focused on the channel model for the non-terrestrial networks, defining deployment scenarios, and identifying the key potential impacts. 3GPP is conducting a follow-up study item in Release 16 on solutions evaluation for NR to support NTNs. See RP-181370, "Study on solutions evaluation for NR to support non-terrestrial network," the disclosure of which is incorporated herein by reference in its entirety.

FIG. 5 depicts a representative satellite radio access network, which usually includes the following components:
   A satellite that refers to a space-borne platform.
   An earth-based gateway that connects the satellite to a base station or a core network, depending on the choice of architecture.
   Feeder link that refers to the link between a gateway and a satellite, and
   Service link that refers to the link between a satellite and a UE.

Depending on the orbit altitude, a satellite may be categorized as low earth orbit (LEO), medium earth orbit (MEO), or geostationary earth orbit (GEO) satellite.
   LEO: typical heights ranging from 250-1,500 km.
   MEO: typical heights ranging from 5,000-25,000 km.
   GEO: height at about 35,786 km.

One of the main differences with respect to terrestrial cells is that the distance is much greater, causing propagation delays to be more than 500 ms in the case of GEO altitudes. This causes very large impacts when adapting the NR protocols to work over satellite.

NR-U

In order to accommodate the ever-increasing data demand, NR is considered for operation in both licensed and unlicensed spectrum. A 3GPP study item on NR-based Access to Unlicensed Spectrum was approved at RAN-77. At this study item, compared to the LTE LAA, NR-U also needs to support non-standalone with DC (Dual Connectivity) and standalone scenarios, where the MAC procedures, including RACH and scheduling procedure on unlicensed spectrum, are subject to the Listen-before-talk (LBT) failures, while there was no such restriction in LTE LAA, since there was licensed spectrum in LAA scenario so the RACH and scheduling related signaling can be transmitted on the licensed spectrum instead of unlicensed spectrum.

Listen-before-talk is designed for unlicensed spectrum co-existence with other RATs. In this mechanism, a radio device applies a clear channel assessment (CCA) check (i.e., channel sensing) before any transmission. The transmitter involves energy detection (ED) over a time period compared to a certain energy detection threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off.

As soon as the transmitter has gained access to a channel, the transmitter is only allowed to perform transmission up to a maximum time duration (namely, the maximum channel occupancy time (MCOT)). The transmissions during the channel occupancy time (COT) may not have any gaps longer than 16 µs. In case there is a gap longer than 16 µs, the UE needs to perform a new LBT before continuing with the transmission. For QoS differentiation, a channel access priority based on the service type has been defined. For example, there are four LBT priority classes are defined for differentiation of channel access priorities between services using contention window size (CWS) and MCOT duration.

As described in 3GPP TR 38.889, "Study on NR-based access to unlicensed spectrum," the disclosure of which is incorporated herein by reference in its entirety, the channel access schemes for NR-based access for unlicensed spectrum can be classified into the following categories:

Category 1: Immediate Transmission after a Short Switching Gap
   This is used for a transmitter to immediately transmit after an UL/DL switching gap inside a COT.
   The switching gap from reception to transmission is to accommodate the transceiver turnaround time and is no longer than 16 µs.
Category 2: LBT without Random Back-Off
   The duration of time that the channel is sensed to be idle before the transmitting entity transmits is deterministic.
Category 3: LBT with Random Back-Off with a Contention Window of Fixed Size
   The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.
Category 4: LBT with Random Back-Off with a Contention Window of Variable Size
   The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

BSR and SR

BSR (Buffer Status Report) are used inform the network that the UE either has new uplink data in its buffers or remaining uplink data in its buffers. The BSRs have different formats that depend on configuration, but in general they contain information of the buffers of so-called LCGs (Logical Channel Group) which is a group of logical channels. Whether the buffer of one or several logical channels are included depends on the configuration. There are four different BSR formats:
   Short BSR format (fixed size),
   Long BSR format (variable length),
   Short truncated BSR format (fixed size), and
   Long Truncated BSR format (variable size)

Furthermore there are three different triggers for BSR:
Regular BSR,
Periodic BSR, and
Padding BSR The size of BSR ranges from 1 Byte up to 9 Bytes, header size not included.

In case the UE does not have any uplink allocation where it can include a BSR, the UE will trigger SRs (Scheduling Request), which is sent on PUCCH on configured SR-resources used to request UL-SCH resources for new transmissions.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR is considered as corresponding SR configuration for the triggered SR.

In case the UE does not have PUCCH resources configured for SR, it will trigger a Random Access procedure.

Non-Prioritized 4-Step RACH

The IE RACH-ConfigGeneric is used to specify the random-access parameters both for regular random access as well as for beam failure recovery.

RACH-ConfigGeneric Information Element

```
-- ASN1START
-- TAG-RACH-CONFIGGENERIC-START
RACH-ConfigGeneric ::=         SEQUENCE {
    prach-ConfigurationIndex       INTEGER (0..255),
    msg1-FDM                       ENUMERATED {one, two, four, eight},
    msg1-FrequencyStart            INTEGER (0..maxNrofPhysicalResourceBlocks-1),
    zeroCorrelationZoneConfig      INTEGER(0..15),
    preambleReceivedTargetPower    INTEGER (-202..-60),
    preambleTransMax               ENUMERATED {n3, n4, n5, n6, n7, n8, n10, n20, n50, n100, n200},
    powerRampingStep               ENUMERATED {dB0, dB2, dB4, dB6},
    ra-ResponseWindow              ENUMERATED {sl1, sl2, sl4, sl8, sl10, sl20, sl40, sl80},
    ...
}
-- TAG-RACH-CONFIGGENERIC-STOP
-- ASN1STOP
```

If a 4-step RACH is not prioritized, the power ramping step size is according to the powerRampingStep in RACH-ConfigGeneric IE, see 3GPP TS 38.321 text below:
1> set PREAMBLE_POWER_RAMPING_STEP to powerRampingStep;

The scaling factor for backoff indicator is set to 1, see 3GPP TS 38.321 text below:
1> set SCALING_FACTOR_BI to 1;

Backoff Parameter values are presented in Table 7.2-1 of TS 38.321.

TABLE 7.2-1

Backoff Parameter values.

| Index | Backoff Parameter value (ms) |
|---|---|
| 0 | 5 |
| 1 | 10 |
| 2 | 20 |
| 3 | 30 |
| 4 | 40 |
| 5 | 60 |

TABLE 7.2-1-continued

Backoff Parameter values.

| Index | Backoff Parameter value (ms) |
|---|---|
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

Prioritized RACH in NR Rel-15

In Rel-15, prioritized RACH can be configured for the 4-step RACH. The prioritized RACH is applicable to random Access procedure initiated for beam failure recovery or for handover.

The IE RA-Prioritization is used to configure prioritized random access.

RA-Prioritization Information Element

```
-- ASN1START
-- TAG-RA-PRIORITIZATION-START
```

```
RA-Prioritization ::=    SEQUENCE {
    powerRampingStepHighPriority   ENUMERATED {dB0, dB2, dB4, dB6},
    scalingFactorBI                ENUMERATED {zero, dot25, dot5, dot75} OPTIONAL,  -- Need R
    ...
}
-- TAG-RA-PRIORITIZATION-STOP
-- ASN1STOP
```

RA-Prioritization field descriptions powerRampingStepHighPrioritiy
Power ramping step applied for prioritized random access procedure.
scalingFactorBI
Scaling factor for the backoff indicator (BI) for the prioritized random access procedure. (see TS 38.321 [3], clause 5.1.4). Value zero corresponds to 0, value dot25 corresponds to 0.25 and so on.

Those of skill in the art will readily recognize that embodiments described herein are not strictly limited to NR, but rather may be advantageously adapted to any wireless communication network supporting Buffer Size Reporting and utilizing a short (e.g., 2-step) Random Access procedure, to reduce latency. Accordingly, terminology used herein, which may be specific to 3GPP LTE/NR is to be considered descriptive only, and is not limiting.

BSR Reporting Configuration

In one embodiment, the network configures a UE with 2-step RA resources that are used for Buffer Status Reporting.

The 2-step RA configuration for BSR reporting may have a specific logical channel or logical channel group list configured for BSR reporting on 2-step RA. In some embodiments, the network may configure which specific logical channels or logical channel groups that, when a BSR is triggered, may use BSR reporting through 2-step RA.

The 2-step RA configuration for BSR reporting may have a SR configuration or configurations configured specifically for triggering a transmission of BSR through 2-step RA. In some embodiments, each logical channel with this corresponding SR configuration triggering a BSR may utilize BSR reporting on 2-step RA.

The 2-step RA configuration for BSR reporting may have smaller MsgA PUSCH resource allocation for BSR. In some embodiments, only a subset of PUSCH occasions, with some small number of PRB allocated, are used by BSR reporting.

The 2-step RA configuration for BSR reporting may have different periodicity. In some embodiments, the periodicity can be aligned with normal MsgA PUSCH set periodicity, but only a subset of the PO sets in the time domain can be specified to be used by BSR report. For example, a bit map can be introduced to indicate which PO sets are allowed for BSR report, where the bit map can be signaled via SIB1 or other system information.

The 2-step RA configuration for BSR reporting may have power control parameters specific to BSR. In some embodiments, a large or separately configured power ramping step and a specific power ramping counter can be used for the MsgA PUSCH retransmission if the BSR is carried.

The 2-step RA configuration for BSR reporting may have lower or a single number of MsgA attempts before RACH failure or fallback. In some embodiments, a configured lower or higher maximum number of 2-step RA attempts (c.f. preambleTransMax) are counted before failure or fallback initiation.

The 2-step RA configuration for BSR reporting may have MsgB window configuration specific for BSR transmission. In some embodiments, a BSR reporting specific (configured) MsgB window may allow more timely retransmissions of MsgA, and incrementation of a maximum MsgA transmission counter, upon MsgB window timer expiry.

The 2-step RA configuration for BSR reporting may have Back-Off configuration specific for BSR reporting. In some embodiments, for the BSR reporting in MsgA, a zero Back-Off may be applied for faster reinitialization of the Random Access procedure, wherein the zero Back-Off means immediate reattempt when no response is received by UE within the RAR/MsgB window, after sending the MsgA. In some embodiments, for the BSR reporting in MsgA, a prioritized back-off is applied, wherein the prioritized back-off can be using smaller value of the back-off time; or scale the back-off indicator similar to release 15 for prioritized random access.

The 2-step RA configuration for BSR reporting may have a BSR on 2-step RA specific RACH Occasion. In some embodiments, resources for Random Access for which, e.g., RACH Occasions are occurring with short periodicities, are exclusive to BSR reporting, in order to improved partition and separation of resources.

The 2-step RA configuration for BSR reporting may have thresholds that may be ignored, or are specific in case the 2-step random access is done for reporting BSR for a specific logical channel. In some embodiments, thresholds for, e.g., selecting 2-Step RA, PUSCH Resource selection, or other, are required to use a separately configured criteria from that of a general RA procedure. Alternatively, a threshold such as the above may be configured or explicitly omitted for the use of 2-step RA for BSR reporting.

In some embodiments, where a UE is configured with dedicated or UE-specific 2-step RA resources (e.g., preamble and PUSCH resource unit), the UE is configured with the 2-step RA for BSR transmission configuration via dedicated RRC signaling, e.g., using an RRCReconfiguration message, when the validity of the UE's timing advance is about to time out (which will trigger removal of the UEs PUCCH resources). If or when the UE subsequently regains a valid timing advance (via a random access procedure) and receives configured PUCCH resources, the 2-step RA configuration for BSR transmission may optionally be removed (automatically, i.e., preconfigured conditional removal, or explicitly through a new RRC message, e.g., RRCReconfiguration, from the gNB). This is useful when the network configures the UE with UE-specific 2-step RA configuration for BSR transmission, in which case the allocated PUSCH resources (for MsgA PUSCH containing BSR) should preferably be reserved for this purpose as short time as possible. In addition, when multiple beams, e.g., SSB beams, are used in a cell, the gNB may have to configure 2-step RA resources, i.e., PRACH and PUSCH resources, per beam, since it cannot be sure which beam the UE will be covered by when it utilizes the 2-step RA resources. Hence, the shorter time that elapses between the transfer of the configuration to the UE, and the UE's utilization thereof, the easier it is for the gNB to predict roughly in which direction the UE will be located in when it utilizes the 2-step RA resources. Hence the gNB can choose to configure 2-step RA resources associated with fewer beams.

In some embodiments, the 2-step RA configuration for BSR transmission is conveyed to the UE at any time, either via dedicated signaling (implying possibly UE-specific configuration), such as RRC signaling, or the broadcast system information (implying common configuration), but with the associated condition that the configuration is valid for the UE only when the UE does not have any PUCCH resources for SR transmission (which is typically when the UE does not have a valid timing advance, i.e., when its timeAlignmentTimer has expired). With this condition, if the configuration is UE-specific, the network only has to "honor" the configuration (and keep the configured PUSCH resources available) during time periods when the UE does not have any PUCCH resources for SR transmission (i.e., typically while the UE does not have a valid timing advance). If the configuration is signaled via broadcast system information, the network is required to keep the PUSCH resources available as long as there is at least one UE in RRC_CONNECTED state which lacks PUCCH resources for SR transmission in the cell.

One way to realize the above-described embodiments, as a simplified variant, is that the gNB configures common 2-step RA resources where some of the 2-step preambles are associated with PUSCH RUs with sizes suitable for BSR (only) transmission, while the other 2-step preambles are associated with PUSCH RUs with sizes suitable for transmission of RRCSetupRequest, RRCResumeRequest or RRCReconfigurationComplete (for completion of a handover).

The preamble-PUSCH RU pairs adapted for BSR (only) transmission are thus useful only for UEs in RRC_CONNECTED state (which are not completing a handover), which lack PUCCH resources for SR transmission (and typically also lack a valid timing advance). As one option, such a UE could be configured—through dedicated signaling or broadcast signaling—to use one of the preamble-PUSCH RU pairs adapted for BSR (only) transmission. As another option, it is left to the UE to choose to either use a preamble-PUSCH RU pairs adapted for BSR (only) transmission and transmit only a BSR (i.e. a Buffer Status Report MAC CE) on the PUSCH, or use one of the preambles associated with larger PUSCH RUs and transmit payload/user data together with a BSR (or only payload/user data if the PUSCH RU is large enough to empty the UE's UL buffer) on the PUSCH.

As further variation of this embodiment, the set of preamble-PUSCH RU pairs adapted for BSR (only) transmissions are further divided into groups adapted to different BSR sizes (as described/listed below).

In another variant, the UE can be configured to initially only make use of the short BSR format regardless if the PUSCH RU are large enough for transmitting a full BSR. Since the short BSR contains information of what logical channel that triggered the BSR, this would allow the UE to indicate to the network the what LCH/LCG and its characteristics that the grant should be adapted for, i.e., to make sure the network sends the correct grant to the UE in terms of the wanted BWP, SCS, URLLC, etc. A padding BSR should be sent in intermediate transmissions as normal procedures to inform the NW of full buffer status.

BSR Reporting Procedural Aspects

In one embodiment the BSR on 2-step RA is only triggered if a specific condition or a set of conditions are fulfilled. For example, the buffer is larger or smaller than a threshold; a logical channel that triggers a BSR has no SR configuration; or a valid PUCCH resource is not available before a configured time after SR has been triggered. As further examples, the BSR on 2-step RA may only be triggered if the logical channel or logical channel groups are configured to use 2-step RA; or the delay-metric of the logical channel is required to be less than a threshold; or if the priority of the logical channel is higher than a configured value. For example, the delay-metric may be the Packet Delay Budget for a specific logical channel. Additionally, the BSR on 2-step RA may only be triggered if the timing alignment of the cell can be met.

In one embodiment, if there is no MsgB received in response to BSR in 2-step RA—for example if MsgA fails to be received by the network or if the MsgB cannot be decoded—the UE will go directly to SR procedures.

As one representative example, the following steps comprise a method, by a UE, for BSR reporting using 2-step RA:
1. UE obtains random-access configuration(s) for a cell, for example for a serving cell the UE is camping on (in RRC_IDLE or RRC_INACTIVE state) or for a target cell (in conjunction with handover), comprising a 2-step random access (RA) configuration including a BSR-specific reporting configuration (as described above);
2. Data arrives in the UE buffer for a logical channel or logical channel group for which a BSR is triggered;
3. The UE determines that no UL-SCH resource is available for BSR transmission and SR is triggered;
4. The UE determines that threshold and criteria for 2-step RA is fulfilled (e.g. RSRP, etc.);
5. The UE determines that this logical channel fulfills certain criteria, as described above;
6. The UE determines from, e.g., a PRACH configuration index, what time and frequency domain resources are to be used for PRACH transmissions for BSR reporting;
7. The UE transmits MsgA using a certain preamble and the associated PUSCH resource as determined by the BSR or message payload size (e.g., MAC SDU payload size as a result of BSR+data); and
8. The UE receives MsgB from the network and cancels pending procedures for BSR reporting and SR transmission (typically grant).

In some embodiments, when the gNB receives a MsgA (preamble+PUSCH transmission), using a preamble and PUSCH Resource Unit which indicate a BSR-transmission, where the gNB fails to decode the PUSCH transmission, but the preamble and PUSCH RU indicates that the PUSCH transmission only contains a BSR, then the gNB does not fallback to 4-step RA and/or request retransmission of MsgA PUSCH, but instead transmits a MsgB containing an UL grant with a size chosen by the gNB, e.g., based on expected characteristics of the data traffic, such as expected transport block size and latency requirements. Alternatively, in case no specific characteristics can be anticipated, the size selection is based on statistics on the average need, or a preconfigured size. This kind of "blind" UL resource allocation serves to reduce the latency of the procedure and the delay until the UE can transmit UL user data. In some embodiments, the gNB employs this behavior only if the received preamble indicates that the UE has delay-sensitive data to transmit (i.e., this assumes that some preambles have been configured to be used only when the pending UL data is delay sensitive).

Procedural Aspects after BSR Using 2-Step RA

When MsgA resources are reserved for BSR transmission, the gNB is aware when a BSR is transmitted by the UE from the use of those resources. This allows BSR transmissions to be processed differently by the gNB than other MsgA transmissions, such as those carrying RRC messages. Unlike RRC messages where an RRC message is expected in response, a Layer 1 response, such as scheduling the UE on UL-SCH, can be sufficient to complete a scheduling request process based on a BSR. Since the UE is in RRC_CONNECTED state so that it can transmit data, it will have a C-RNTI and need not be assigned one in the random access process. This means that, unless it is needed for other reasons, such as to provide a timing advance, it is not necessary to receive a random access response as would normally follow a MsgA transmission. Thus in one embodiment the UE can directly monitor a PDCCH for an uplink grant with the UE's C-RNTI, and when one is found, determine that the scheduling request process is complete. Since MsgA transmission can be considered a random access process, in an alternative embodiment the UE starts a random access process in response to the need to transmit a BSR. The UE again monitors a PDCCH for an uplink grant with the UE's C-RNTI, but then considers the random access procedure as complete when it successfully receives an UL grant for PUSCH carrying UL-SCH. In cases where the UE does not have a valid timing advance, in one approach, the gNB will transmit a random access response to the UE, and the UE will consider the random access procedure complete if it successfully receives the random access response and the response that is addressed to the UE.

A benefit of monitoring a PDCCH for an UL grant instead of receiving an RAR in MsgB is that it can be simpler for the UE. In order to receive an RAR, the UE decodes a PDCCH, then a PDSCH carrying a MsgB, then extracts the UL grant from the RAR in MsgB, and then transmits PUSCH according to the UL grant. When the UE monitors a PDCCH for an UL grant, it needs only to decode the PDCCH and transmit the PUSCH according to the UL grant. This reduces not only latency, but power consumption.

A second benefit of monitoring a PDCCH for an UL grant instead of receiving an RAR in MsgB is that the RAR requires both the use of a PDCCH and a PDSCH, which increases the overhead on these channels. Furthermore, if the RAR is addressed to multiple UEs, a relatively large amount of resources must be used for PUSCH and PDCCH since they must be successfully received by the UE with the worst channel conditions. By contrast, the UL grant on PDCCH is addressed to a single UE, and less overhead can be used.

Therefore, in some embodiments, a UE transmits a random access message and monitors a control channel for control information that provides an uplink grant for a PUSCH carrying an UL-SCH, where the grant is addressed to a C-RNTI used by the UE. When the UE successfully receives the uplink grant, it considers the random access procedure successfully completed. It otherwise continues the random access procedure. In some such embodiments, the UE may also monitor a control channel for control information that provides a downlink grant for a PDSCH carrying a random access response. If it receives the random access response successfully, it processes the random access response as a second mechanism to determine if the random access procedure is successfully completed. In some embodiments, the random access message is transmitted in a resource associated with buffer status report transmission.

Methods and Apparatuses

Figure 6:
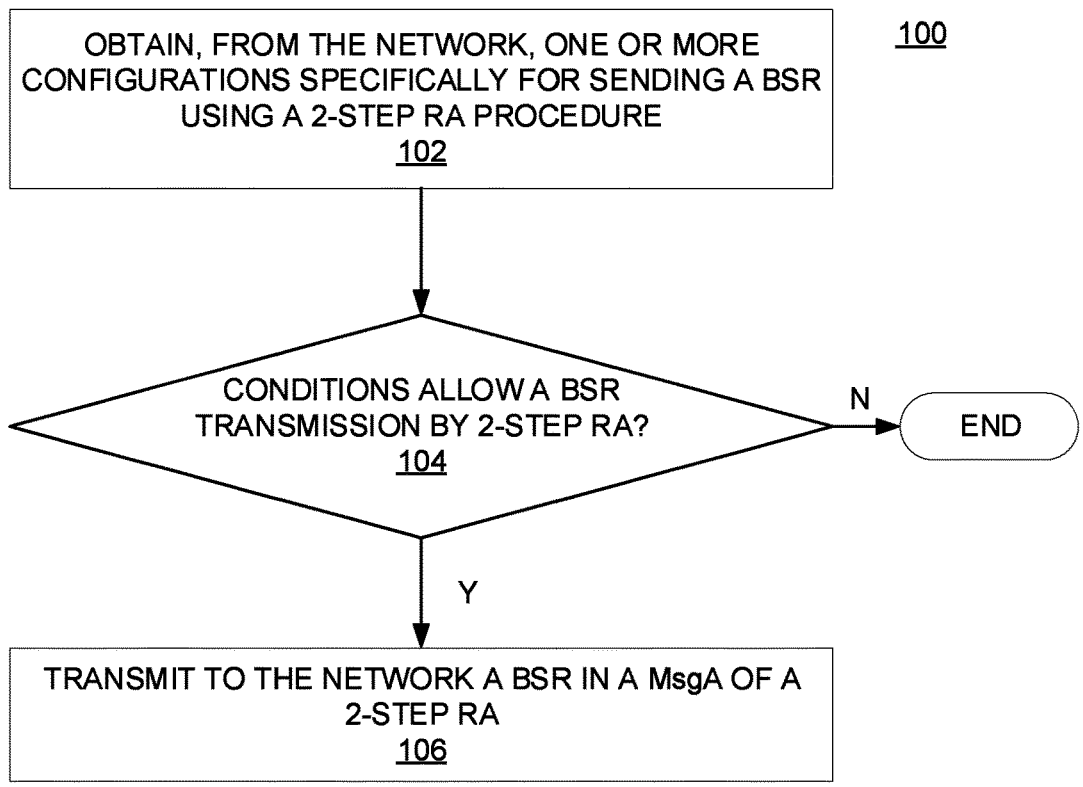
FIG. 6 is a flow diagram of a method of buffer status reporting by a wireless device.

FIG. 6 depicts a method 100 in accordance with particular embodiments. The method 100 is performed by a wireless device operative in a wireless communication network, and is a method of low-latency buffer status reporting. One or more configurations for sending a Buffer Status Report (BSR) using a 2-step Random Access (RA) procedure are obtained from the network (block 102). Whether conditions allow a BSR transmission by 2-step RA is determined (block 104). If conditions allow, a BSR is transmitted to the network in a MsgA of a 2-step RA (block 106). Otherwise (block 104), the method terminates (for example, the wireless device may attempt to send the BSR using a 4-step RA, or may wait for conditions to change).

Figure 7:
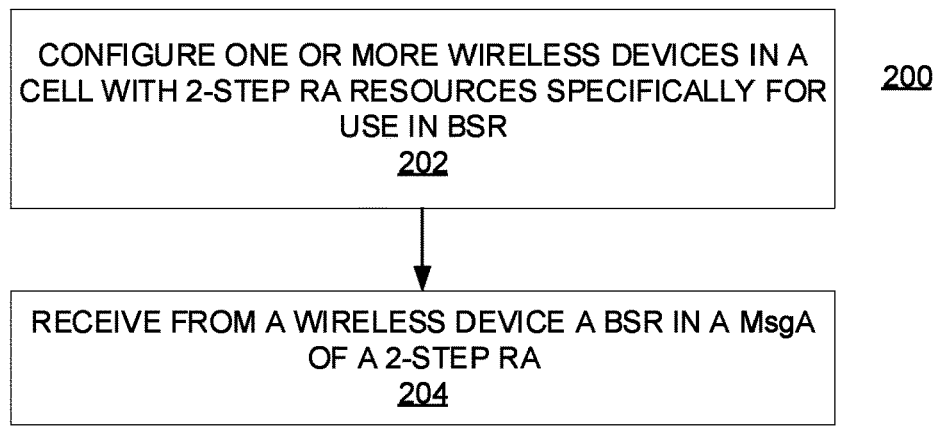
FIG. 7 is a flow diagram of a method of receiving buffer status reporting from a wireless device by a base station.

FIG. 7 depicts a method 200 in accordance with other particular embodiments. The method 200 is performed by a base station operative in a wireless communication network, and is a method of receiving buffer status reporting from a wireless device with low latency. One or more wireless devices in a cell are configured with 2-step Random Access (RA) resources for use in Buffer Status Reporting (BSR) (block 202). A BSR in a MsgA of a 2-step RA is received from a wireless device (block 204).

Note that apparatuses described herein may perform the methods 100, 200 herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
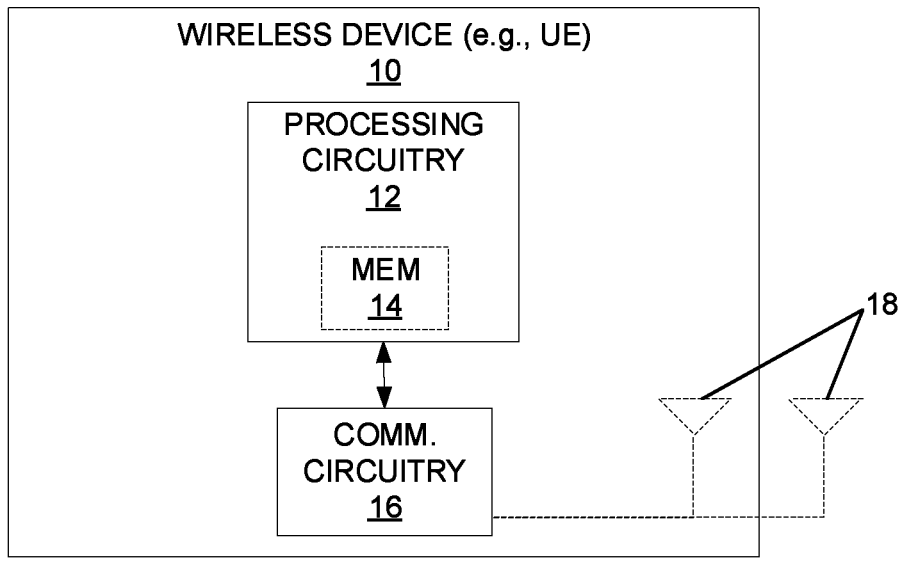
FIG. 8 is a hardware block diagram of a wireless device.

FIG. 8 for example illustrates a hardware block diagram of a wireless device 10, e.g., a UE, as implemented in accordance with one or more embodiments. As shown, the wireless device 10 includes processing circuitry 12 and communication circuitry 16. The communication circuitry 16 (e.g., radio circuitry) is configured to transmit and/or receive information to and/or from one or more other nodes, e.g., via any communication technology. Such communication may occur via one or more antennas 18 that are either internal or external to the wireless device 10, as indicated by the dashed lines. The processing circuitry 12 is configured to perform processing described above, such as by executing instructions stored in memory 14. The processing circuitry 12 in this regard may implement certain functional means, units, or modules.

Figure 9:
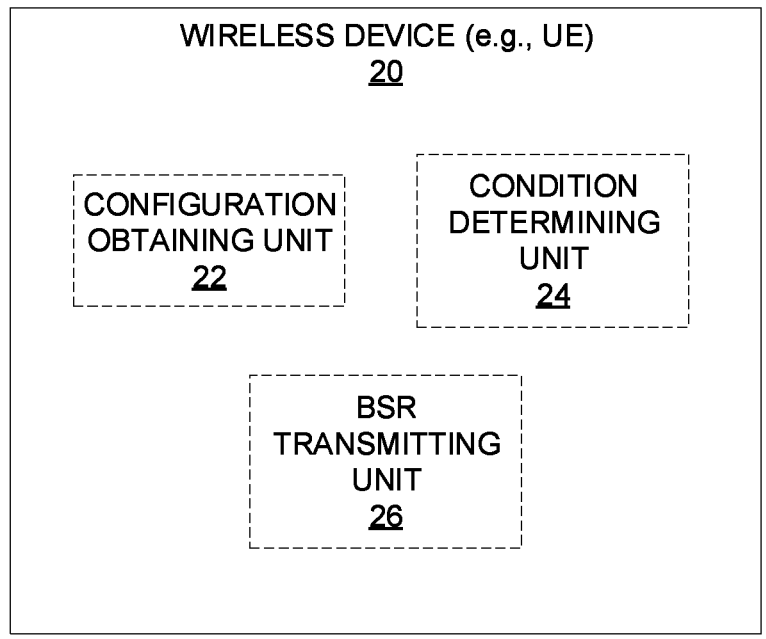
FIG. 9 is a functional block diagram of a wireless device.
Figure 12:
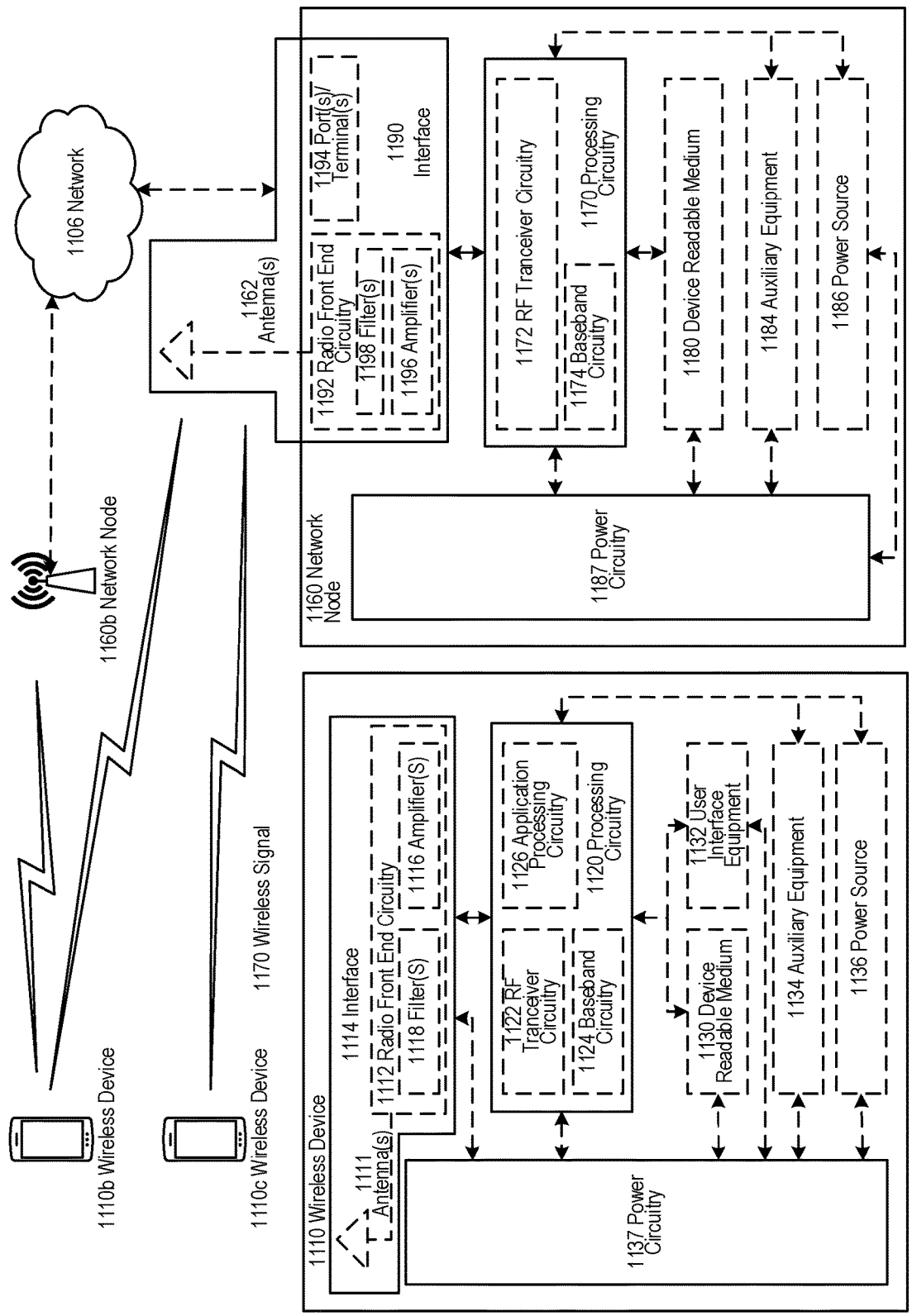
FIG. 12 is a diagram of a wireless network.

FIG. 9 illustrates a functional block diagram of a wireless device 20, e.g., a UE, in a wireless network according to still other embodiments (for example, the wireless network shown in FIG. 12). As shown, the wireless device 20 implements various functional means, units, or modules, e.g., via the processing circuitry 12 in FIG. 8 and/or via software code. These functional means, units, or modules, e.g., for implementing the method(s) herein, include for instance: configuration obtaining unit 22, condition determining unit 24, and BSR transmitting unit 26. The unit configuration obtaining 22 is configured to obtain, from the network, one or more configurations for sending a Buffer Status Report (BSR) using a 2-step Random Access (RA) procedure. The condition determining unit 24 is configured to determine whether conditions allow a BSR transmission by 2-step RA. The BSR transmitting unit 26 is configured to transmit to the network a BSR in a MsgA of a 2-step RA.

Figure 10:
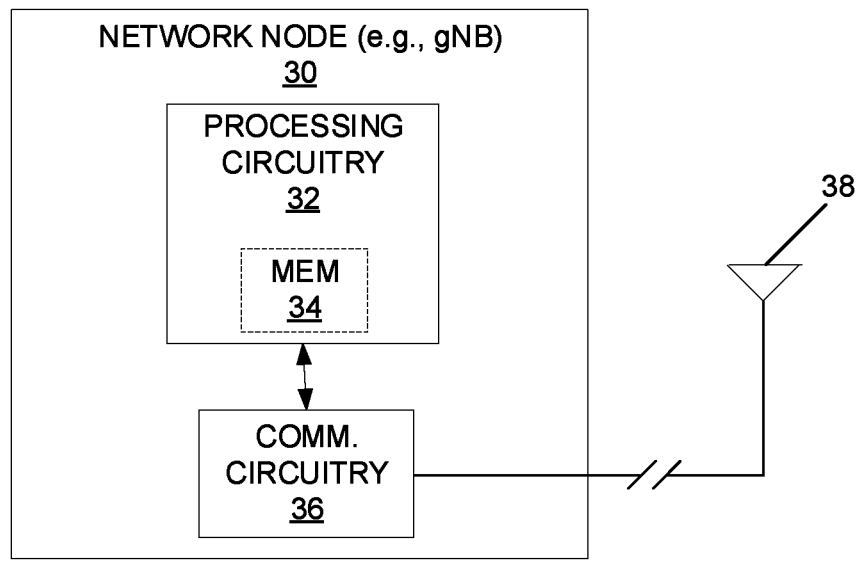
FIG. 10 is a hardware block diagram of a base station.

FIG. 10 illustrates a hardware block diagram of a network node 30, e.g., a gNB, as implemented in accordance with one or more embodiments. As shown, the network node 30 includes processing circuitry 32 and communication circuitry 36. The communication circuitry 36 is configured to transmit and/or receive information to and/or from one or more other nodes, e.g., via any communication technology. Such communication may occur via one or more antennas 38, which may be located separately from the network node 30, such as on a tower or building, as indicated by the broken connection to communication circuitry 36. The processing circuitry 32 is configured to perform processing described above, such as by executing instructions stored in memory 34. The processing circuitry 32 in this regard may implement certain functional means, units, or modules.

Figure 11:
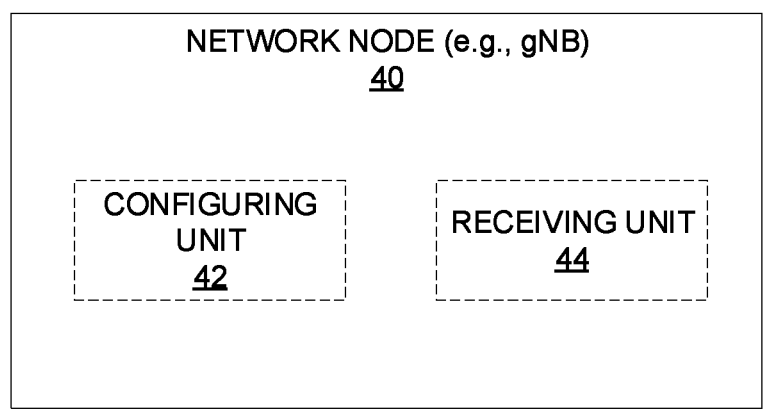
FIG. 11 is a functional block diagram of a base station.

FIG. 11 illustrates a functional block diagram of an network node 40, e.g., a gNB, in a wireless network according to still other embodiments (for example, the wireless network shown in FIG. 12). As shown, the network node 40 implements various functional means, units, or modules, e.g., via the processing circuitry 32 in FIG. 10 and/or via software code. These functional means, units, or modules, e.g., for implementing the method(s) herein, include for instance: configuring unit 42 and receiving unit 44. The configuring unit 42 is configured to configure one or more wireless devices in a cell with 2-step Random Access (RA) resources for use in Buffer Status Reporting (BSR). The receiving unit 44 is configured to receive from a wireless device a BSR in a MsgA of a 2-step RA.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Network Description and Over the Top Transmissions

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160*b*, and wireless devices (WDs) QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and WD QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
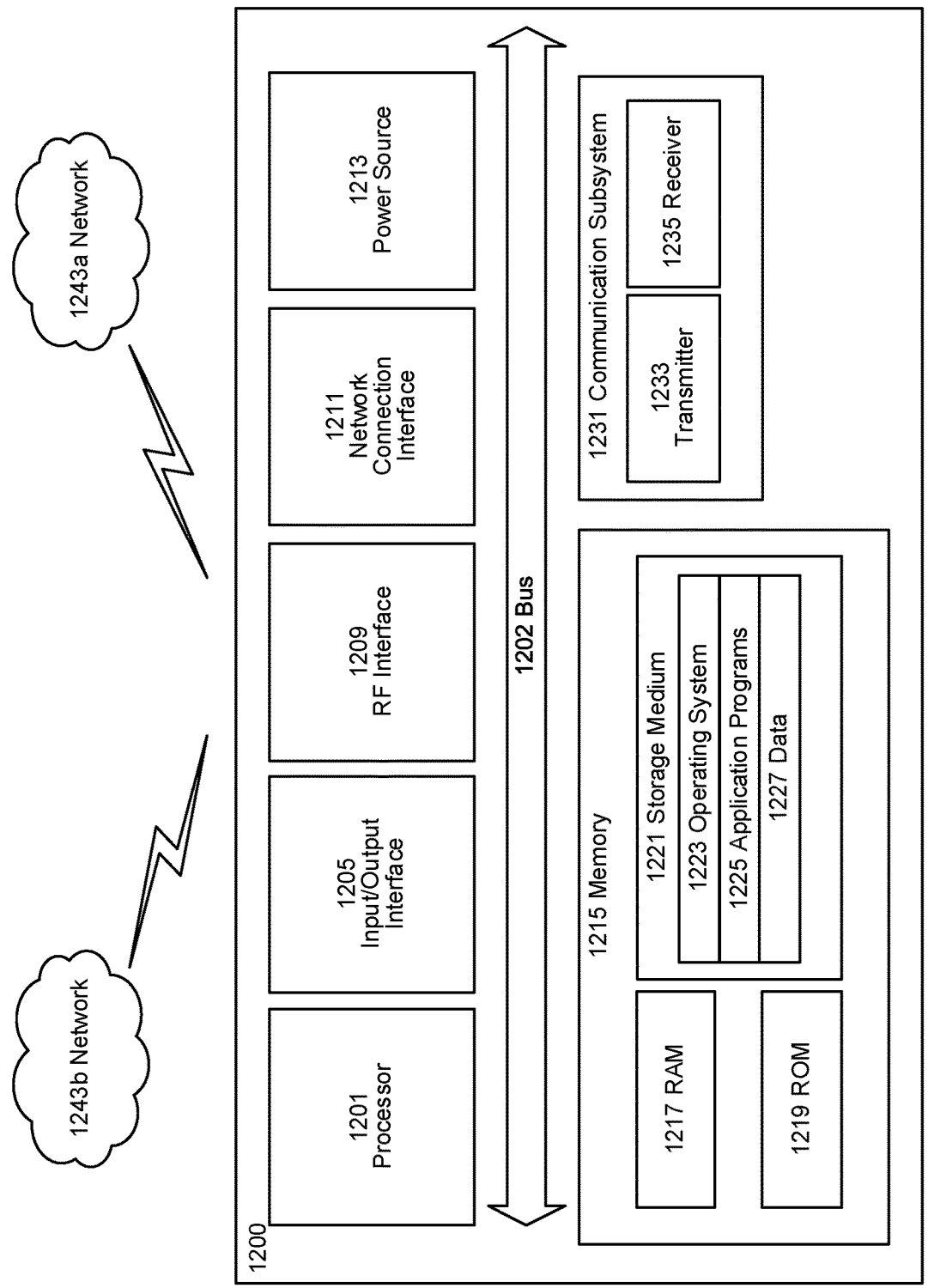
FIG. 13 is a block diagram of a UE.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
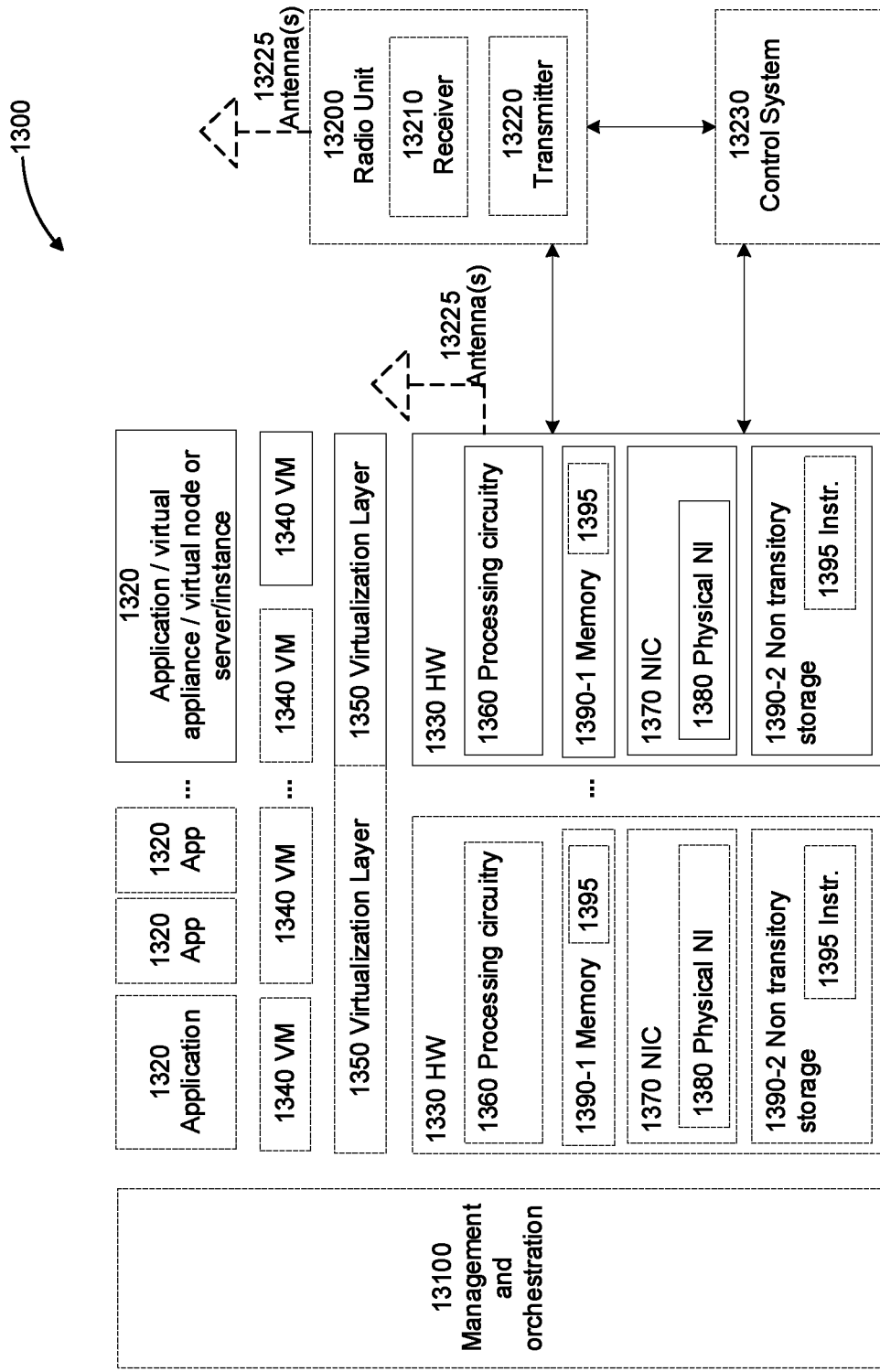
FIG. 14 is a schematic block diagram illustrating a virtualization environment.

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
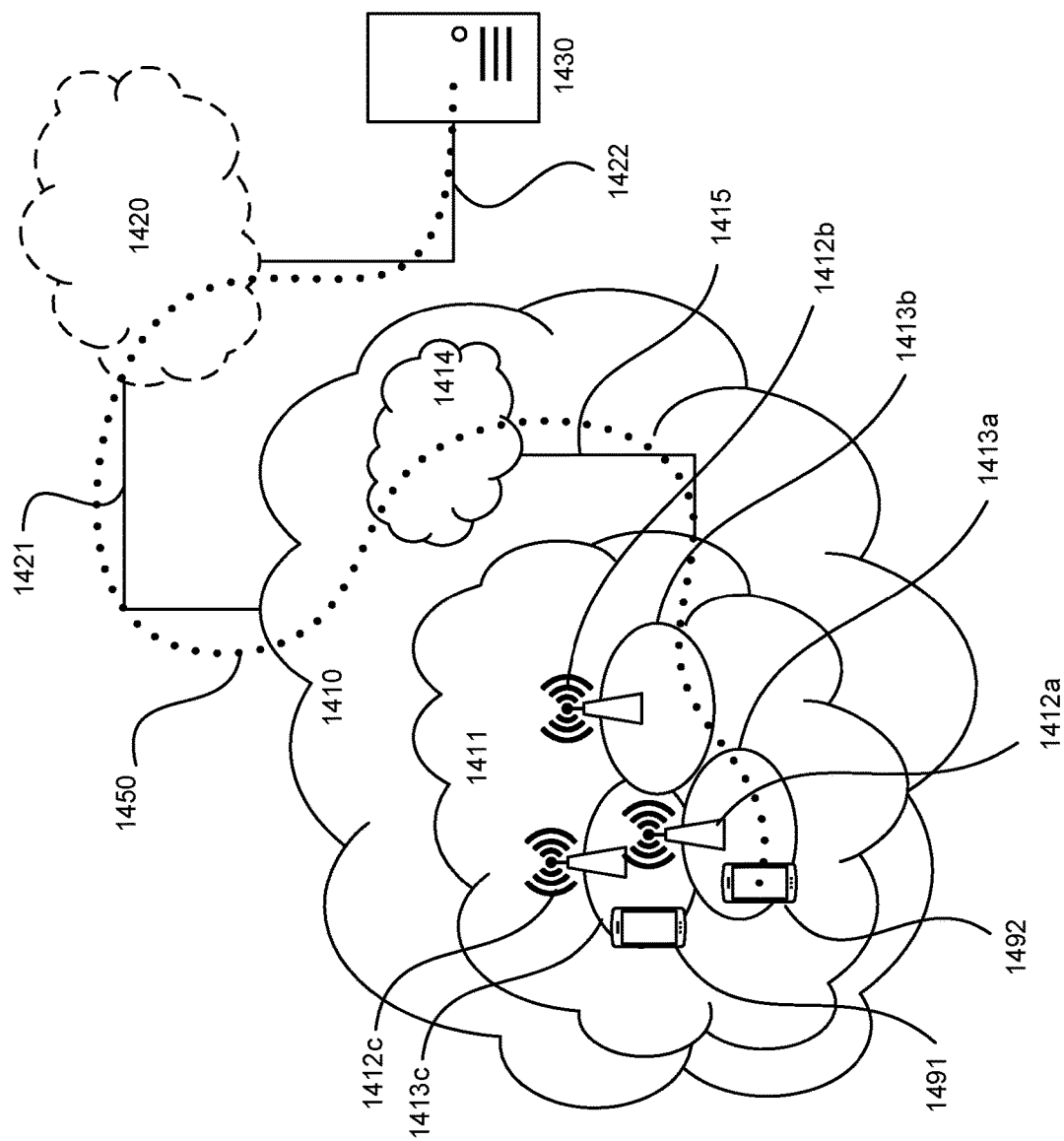
FIG. 15 illustrates a telecommunication network connected via an intermediate network to a host computer.

FIG. 15 illustrates a telecommunication network connected via an intermediate network to a host computer in accordance with some embodiments. In particular, with reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, or a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 16:
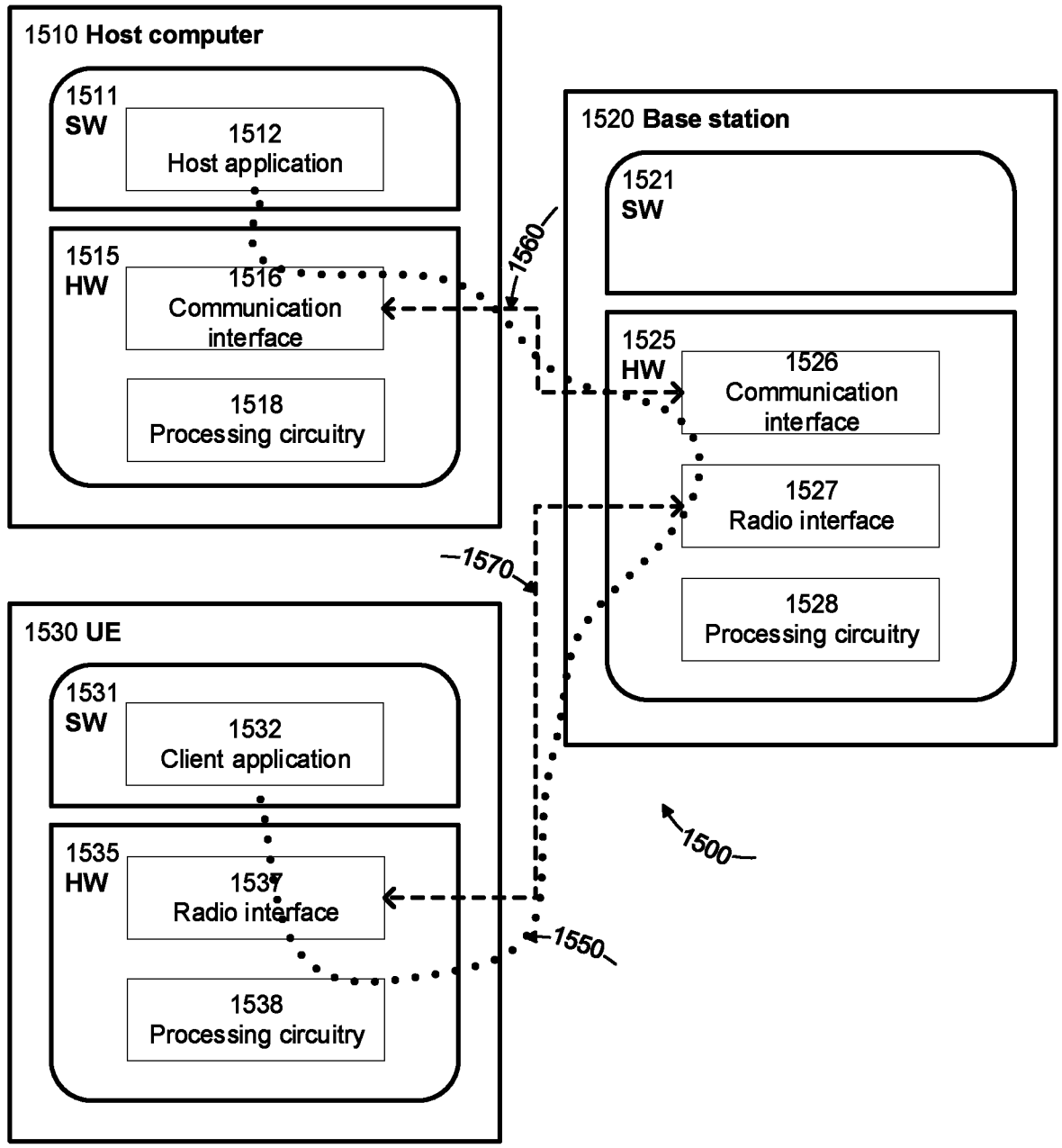
FIG. 16 illustrates host computer communicating via a base station with a user equipment over a partially wireless connection.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency and thereby provide benefits such as improved user experience by reducing user waiting time, enabling near-real-time control applications such as autonomous vehicle control, and the like.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17:
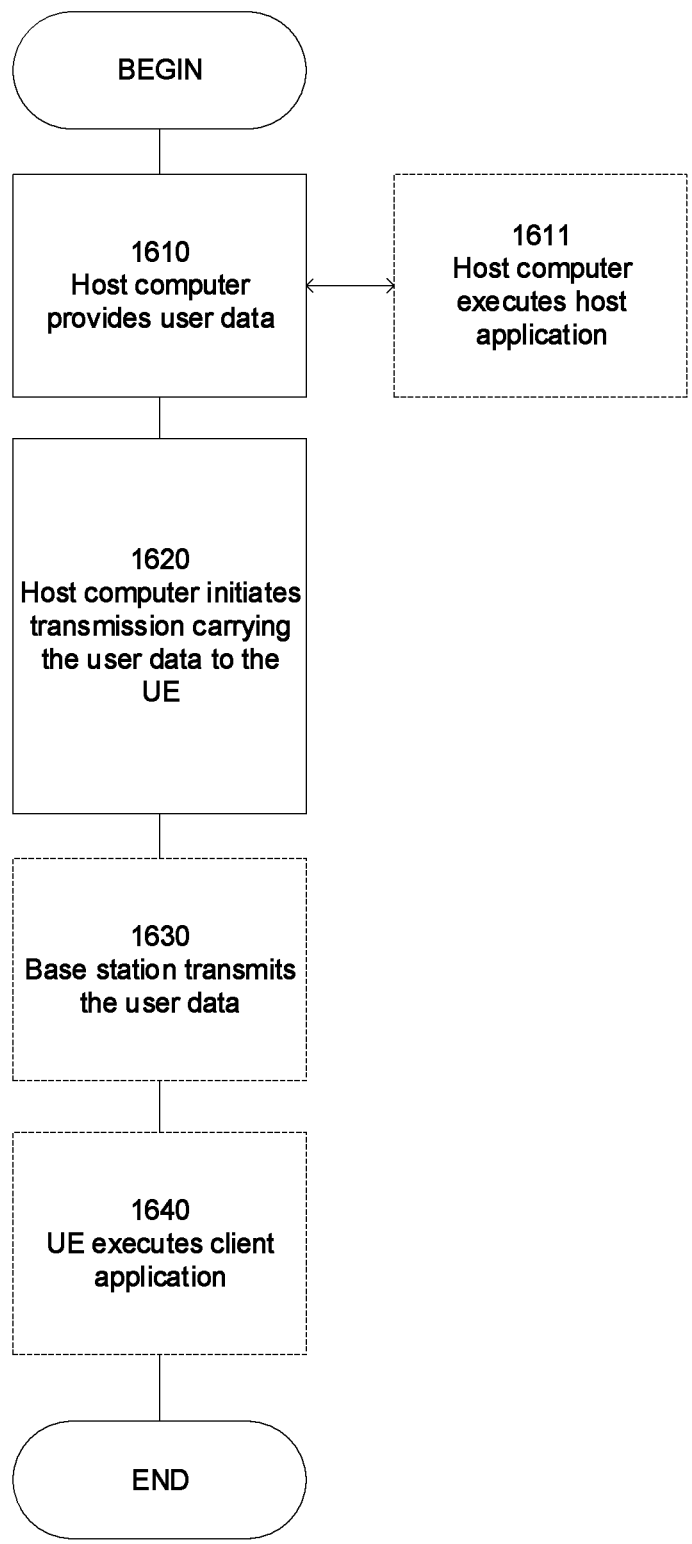
FIG. 17 is a flowchart illustrating a method implemented in a communication system.

FIG. 17 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 18:
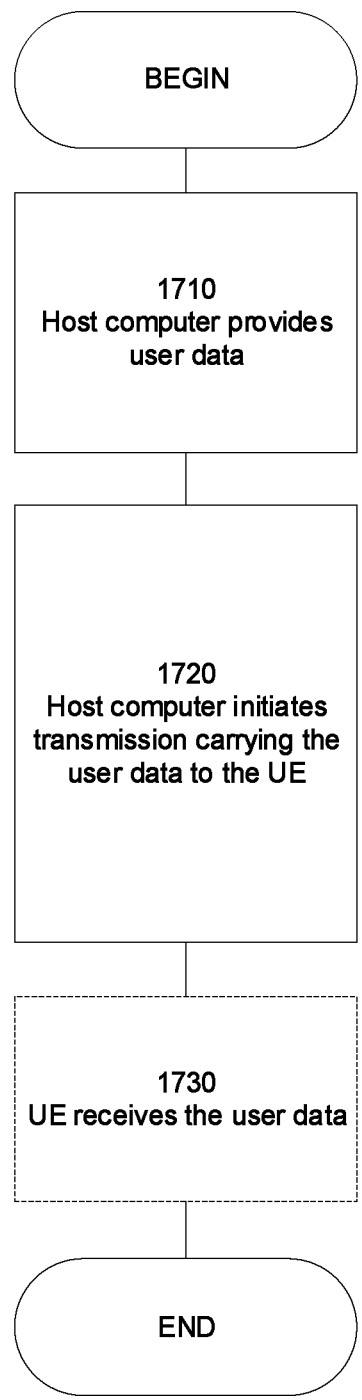
FIG. 18 is a flowchart illustrating another method implemented in a communication system.

FIG. 18 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 19:
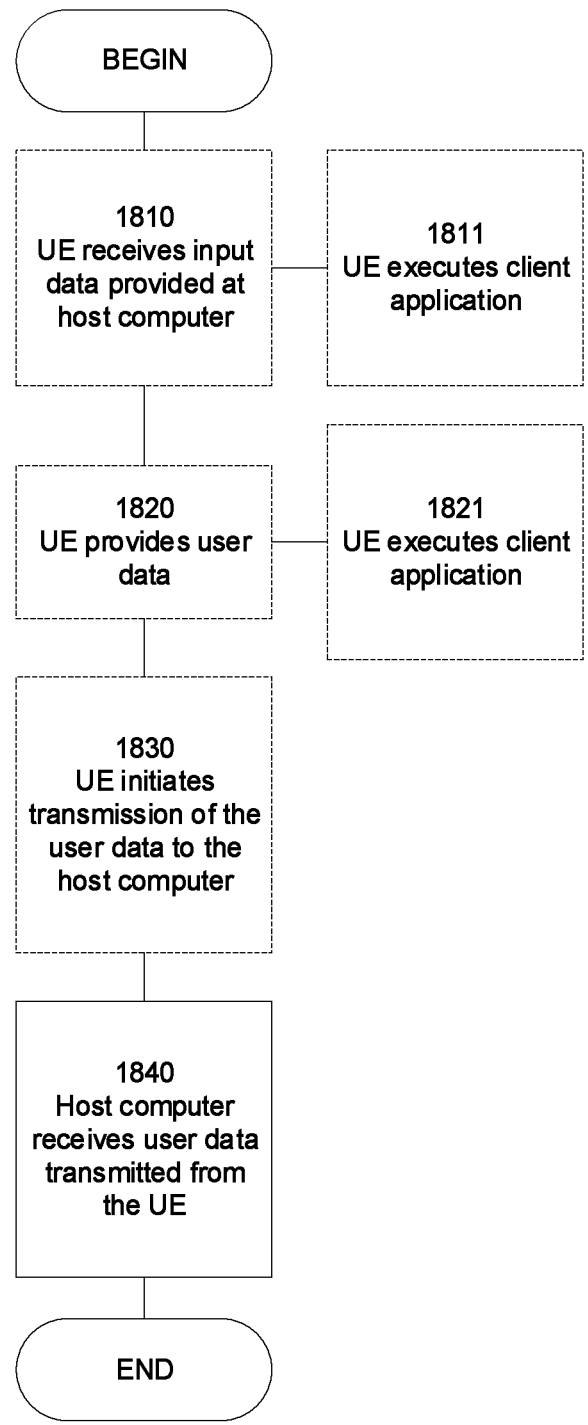
FIG. 19 is a flowchart illustrating yet another method implemented in a communication system.

FIG. 19 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 20:
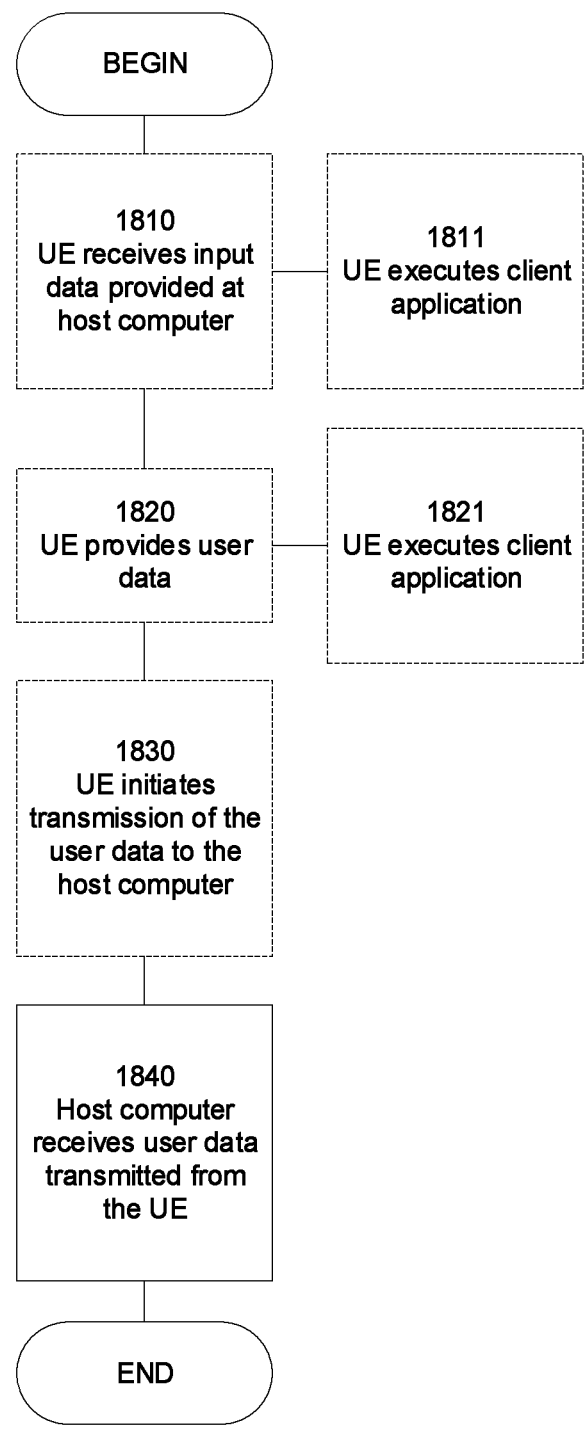
FIG. 20 is a flowchart illustrating still another method implemented in a communication system.

FIG. 20 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Embodiments described herein present numerous advantages over the prior art. Using embodiments disclosed herein, the time for a UE to receive uplink scheduling, upon the receipt of UL data, is greatly reduced, reducing overall latency. In some embodiments, power consumption by the UE is similarly reduced. Furthermore, the network resources required to support BSR over 2-step RA are greatly reduced, as compared to conventional 4-step RA.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
ACK Acknowledgement (HARQ)
BCH Broadcast Channel
BSR Buffer Status Report
CBRA Contention Based RACH
CFRA Contention Free RACH
CCA Clear Channel Assessment
COT Channel Occupancy Time
CP Cyclic Prefix
CQI Channel Quality information
C-RNTI Cell RNTI
CRM Contention Resolution Message
CSI Channel State Information
DL Downlink
DMRS Demodulation Reference Signal
ED Energy Detection
eNB E-UTRAN NodeB
FDD Frequency Division Duplex
FFS For Further Study
GEO Geostationary Earth Orbit
gNB next generation base station (in NR)
HARQ Hybrid Automatic Repeat Request
HO Handover
IE Information Element
IoT Internet of Things
LAA License Assisted Access
LBT Listen-Before-Talk
LEO Low Earth Orbit
LTE Long Term Evolution
M2M Machine to Machine
MAC Medium Access Control
MCOT Maximum Channel Occupancy Time
MEO Medium Earth Orbit
MIB Master Information Block
Msg/msg Message
MTC Machine Type Communication
NACK Negative Acknowledgement (HARQ)
NR New Radio
NR-U NR Unlicensed (NR operated in unlicensed spectrum.)
NW Network
OFDM Orthogonal Frequency Division Multiplexing
OFDMA Orthogonal Frequency Division Multiple Access
PBCH Physical Broadcast Channel
PO PUSCH Occasion
PRACH Physical Random Access Channel
PSS Primary Synchronization Signal
PUCCH Physical Uplink Control Channel
PUSCH Physical Uplink Shared Channel
RA Random Access
RACH Random Access Channel
RAN Radio Access Network
RAR Random Access Response
RAT Radio Access Technology
RNTI Radio Network Temporary Identifier
RO RACH Occasion
RRC Radio Resource Control
RRM Radio Resource Management
SCH Synchronization Channel
SCell Secondary Cell
SI System Information
SIB System Information Block
SR Scheduling Request
SS Synchronization Signal SSB Synchronization Signal Block
SSS Secondary Synchronization Signal
TDD Time Division Duplex
TSS Tertiary Synchronization Signal
TXOP Transmit Opportunity
UE User Equipment
UL Uplink
URLLC Ultra-Reliable Low-Latency Communication Representative Embodiments Group A Embodiments 1. A method, performed by a wireless device operative in a wireless communication network, of buffer status reporting, the method comprising:
obtaining, from the network, one or more configurations for sending a Buffer Status Report (BSR) using a 2-step Random Access (RA) procedure;
receiving data in a buffer; and
transmitting to the network a BSR in a MsgA of a 2-step RA.
2. The method of embodiment 1 wherein obtaining a configuration for sending a BSR using a 2-step RA procedure from the network comprises obtaining the configuration from one of a serving cell on which the wireless device is camped and a handover target cell.
3. The method of any of embodiments 1-2 further comprising, prior to transmitting, determining from a Physical Random Access Channel (PRACH) configuration index the time and frequency domain resources available for BSR reporting.
4. The method of any of embodiments 1-3 further comprising, after transmitting the BSR in a MsgA of a 2-step RA, monitoring a Physical Downlink Control Channel (PDCCH) to obtain an uplink grant.
5. The method of any of embodiments 1-5 further comprising receiving a Random Access Response (RAR) from the network in a MsgB of the 2-step RA.
6. The method of any of embodiments 1-5 wherein obtaining a configuration for sending a BSR using a 2-step RA procedure comprises obtaining a configuration for sending a BSR using a 2-step RA procedure that is specific to a logical channel or a logical channel group, or wherein the configuration specifies which logical channel or logical channel group is used for the BSR.
7. The method of any of embodiments 1-6 wherein obtaining a configuration for sending a BSR using a 2-step RA procedure comprises obtaining a configuration that is configured specifically for triggering a transmission of BSR using a 2-step RA procedure.
8. The method of any of embodiments 1-7 wherein obtaining a configuration for sending a BSR using a 2-step RA procedure comprises obtaining a configuration wherein only a subset of Physical Uplink Shared Channel (PUSCH) resources allocated to a 2-step RA MsgA are allocated for BSR.
9. The method of any of embodiments 1-8 wherein obtaining a configuration for sending a BSR using a 2-step RA procedure comprises obtaining a configuration wherein only a subset of PUSCH occasion (PO) sets in the time domain are specified to be used for BSR reporting.
10. The method of embodiment 9 wherein the PO sets allocated for BSR reporting, out of all PO sets, are indicated by a bit map signalled by the network.
11. The method of any of embodiments 1-10 wherein obtaining a configuration for sending a BSR using a 2-step RA procedure comprises obtaining a configuration specifying one or both of a power ramping step and a specific power ramping counter for retransmissions of MsgA PUSCH containing BSR.
12. The method of any of embodiments 1-11 wherein obtaining a configuration for sending a BSR using a 2-step RA procedure comprises obtaining a configuration specifying a maximum number of attempts to transmit MsgA in a 2-step RA before failure or fallback initiation.
13. The method of any of embodiments 1-12 wherein obtaining a configuration for sending a BSR using a 2-step RA procedure comprises obtaining a configuration specifying one or both of a MsgB window duration and a maximum count of MsgA retransmissions if no associated MsgB is received within the MsgB window.
14. The method of any of embodiments 1-13 wherein obtaining a configuration for sending a BSR using a 2-step RA procedure comprises obtaining a configuration specifying a zero Back-Off indicating immediate retransmission of the MsgA if no associated MsgB is received within a specified MsgB window.
15. The method of any of embodiments 1-13 wherein obtaining a configuration for sending a BSR using a 2-step RA procedure comprises obtaining a configuration specifying a prioritized Back-Off indicating a smaller delay for retransmission of the MsgA, if no associated MsgB is received within a specified MsgB window, than for 2-step RA procedures not transmitting BSR.
16. The method of any of embodiments 1-13 wherein obtaining a configuration for sending a BSR using a 2-step RA procedure comprises obtaining a configuration specifying a prioritized Back-Off indicating a delay for retransmission of the MsgA, if no associated MsgB is received within a specified MsgB window, that is scaled by priority.
17. The method of any of embodiments 1-16 wherein obtaining a configuration for sending a BSR using a 2-step RA procedure comprises obtaining a configuration defining at least one RACH Opportunity as exclusive to BSR reporting.
18. The method of any of embodiments 1-17 wherein obtaining a configuration for sending a BSR using a 2-step RA procedure comprises obtaining a configuration specifying that one or more thresholds related to PUSCH resource selection or 2-step RA are specifically configured or may be omitted for 2-step RA reporting BSR.
19. The method of any of embodiments 1-18 wherein obtaining a configuration for sending a BSR using a 2-step RA procedure comprises obtaining a configuration specifying that it is valid only if the wireless device does not have any PUCCH resources for SR transmission.
20. The method of embodiment 19 further comprising removing a configuration for sending a BSR using a 2-step RA procedure when the wireless device receives configured PUCCH resources.
21. The method of any of embodiments 1-20 wherein obtaining a configuration for sending a BSR using a 2-step RA procedure comprises obtaining a configuration wherein the preamble is associated with PUSCH Resource Units (RU) with sizes suitable for BSR transmission but too small to contain an RRC signalling message.
22. The method of embodiment 21 wherein transmitting to the network a BSR in a MsgA of a 2-step RA comprises transmitting only the BSR using a configuration with PUSCH RUs only suitable for BSR transmission.
23. The method of embodiment 21 wherein transmitting to the network a BSR in a MsgA of a 2-step RA comprises transmitting the BSR together with non-BSR data using a configuration with PUSCH RUs large enough for more than BSR transmission.

26. The message of any of embodiments 1-23 wherein transmitting to the network a BSR in a MsgA of a 2-step RA comprises transmitting the BSR using only a short BSR format.

27. The method of any of embodiments 1-26 further comprising, if the transmitted MsgA of the 2-step RA containing the BSR is not received by the network or the wireless device cannot decode a responsive MsgB, performing a Scheduling Resource (SR) procedure.

28. A method, performed by a wireless device operative in a wireless communication network, of buffer status reporting, the method comprising:
   determining that conditions allow a Buffer Status Report (BSR) using a 2-step Random Access (RA) procedure; and
   transmitting to the network a BSR in a MsgA of a 2-step RA, according to the determined conditions.

29. The method of embodiments 28 wherein determining that conditions allow a BSR transmission by 2-step RA comprises determining that no uplink shared channel resource is available for a BSR transmission and a Scheduling Request (SR) is triggered.

30. The method of any of embodiments 28-29 wherein determining that conditions allow a BSR transmission by 2-step RA comprises determining that the data received in a buffer exceeds a threshold.

31. The method of any of embodiments 28-30 wherein determining that conditions allow a BSR transmission by 2-step RA comprises determining that a logical channel triggering the BSR has no SR configuration.

32. The method of any of embodiments 28-31 wherein determining that conditions allow a BSR transmission by 2-step RA comprises determining that a valid PUCCH resource is not available before a configured time after SR has been triggered.

33. The method of any of embodiments 28-32 wherein determining that conditions allow a BSR transmission by 2-step RA comprises determining that a logical channel or logical channel group for which the BSR is triggered uses, or is configured to use, 2-step RA to report the BSR.

34. The method of any of embodiments 28-33 wherein determining that conditions allow a BSR transmission by 2-step RA comprises determining that a logical channel or logical channel group for which the BSR is triggered is configured to use 2-step RA to report the BSR.

35. The method of any of embodiments 28-34 wherein determining that conditions allow a BSR transmission by 2-step RA comprises determining that a logical channel or logical channel group for which the BSR is triggered has a delay metric less than a threshold.

36. The method of any of embodiments 28-35 wherein determining that conditions allow a BSR transmission by 2-step RA comprises determining that a logical channel or logical channel group for which the BSR is triggered has a priority higher than a configured value.

37. The method of any of embodiments 28-36 wherein determining that conditions allow a BSR transmission by 2-step RA comprises determining that the wireless device can meet a timing alignment of the cell.

38. A method, performed by a wireless device operative in a wireless communication network, of buffer status reporting, the method comprising:
   transmitting to the network a BSR in a MsgA of a 2-step Random Access (RA) procedure; and
   monitoring a Physical Downlink Control Channel (PDCCH) to obtain an uplink grant.

39. The method of embodiment 38 wherein the wireless device receives an uplink grant in the PDCCH, and does not receive a MsgB pursuant to the 2-step RA.

40. The method of embodiment 38 further comprising receiving a Random Access Response (RAR) from the network in a MsgB of the 2-step RA.

AA. The method of any of the previous embodiments, further comprising:
   providing user data; and
   forwarding the user data to a host computer via the transmission to the base station.

Group B Embodiments [Numbering Intentionally Skipped to 51]

51. A method, performed by a base station operative in a wireless communication network, of receiving buffer status reporting from a wireless device with low latency, the method comprising:
   configuring one or more wireless devices in a cell with 2-step Random Access (RA) resources for use in Buffer Status Reporting (BSR);
   receiving from a wireless device a BSR in a MsgA of a 2-step RA.

52. The method of embodiment 51 further comprising:
   in response to receiving from a wireless device a BSR in a MsgA of a 2-step RA, transmitting to the wireless device a Random Access Response in MsgB of a 2-step RA.

53. The method of embodiment 51 further comprising:
   in response to receiving from a wireless device a BSR in a MsgA of a 2-step RA, transmitting to the wireless device an uplink grant in a Physical Downlink Control Channel (PDCCH).

54. The method of any of embodiments 51-53 wherein configuring one or more wireless devices in a cell with 2-step RA resources for use in BSR comprises configuring BSR using 2-step RA that is specific to a logical channel or a logical channel group.

55. The method of any of embodiments 51-54 wherein configuring one or more wireless devices in a cell with 2-step RA resources for use in BSR comprises providing a configuration that is configured specifically for triggering a transmission of BSR using a 2-step RA procedure.

56. The method of any of embodiments 51-55 wherein configuring one or more wireless devices in a cell with 2-step RA resources for use in BSR comprises providing a configuration wherein only a subset of Physical Uplink Shared Channel (PUSCH) resources allocated to a 2-step RA MsgA are allocated for BSR.

57. The method of any of embodiments 51-56 wherein configuring one or more wireless devices in a cell with 2-step RA resources for use in BSR comprises providing a configuration wherein only a subset of PUSCH occasion (PO) sets in the time domain are specified to be used for BSR reporting.

58. The method of embodiment 57 wherein the PO sets allocated for BSR reporting, out of all PO sets, are indicated by a bit map signalled by the network.

59. The method of any of embodiments 51-58 wherein configuring one or more wireless devices in a cell with 2-step RA resources for use in BSR comprises providing a configuration specifying one or both of a power ramping step and a specific power ramping counter for retransmissions of MsgA PUSCH containing BSR.

60. The method of any of embodiments 51-59 wherein configuring one or more wireless devices in a cell with 2-step RA resources for use in BSR comprises providing a configuration specifying a maximum number of attempts to transmit MsgA in a 2-step RA before failure or fallback initiation.

61. The method of any of embodiments 51-60 wherein configuring one or more wireless devices in a cell with 2-step RA resources for use in BSR comprises providing a configuration specifying one or both of a MsgB window duration and a maximum count of MsgA retransmissions if no associated MsgB is received within the MsgB window.

62. The method of any of embodiments 51-61 wherein configuring one or more wireless devices in a cell with 2-step RA resources for use in BSR comprises providing a configuration specifying a zero Back-Off indicating immediate retransmission of the MsgA if no associated MsgB is received within a specified MsgB window.

63. The method of any of embodiments 51-62 wherein configuring one or more wireless devices in a cell with 2-step RA resources for use in BSR comprises providing a configuration specifying a prioritized Back-Off indicating a smaller delay for retransmission of the MsgA, if no associated MsgB is received within a specified MsgB window, than for 2-step RA procedures not transmitting BSR.

64. The method of any of embodiments 51-63 wherein configuring one or more wireless devices in a cell with 2-step RA resources for use in BSR comprises providing a configuration specifying a prioritized Back-Off indicating a delay for retransmission of the MsgA, if no associated MsgB is received within a specified MsgB window, that is scaled by priority.

65. The method of any of embodiments 51-64 wherein configuring one or more wireless devices in a cell with 2-step RA resources for use in BSR comprises providing a configuration defining at least one RACH Opportunity as exclusive to BSR reporting.

66. The method of any of embodiments 51-65 wherein configuring one or more wireless devices in a cell with 2-step RA resources for use in BSR comprises providing a configuration specifying that one or more thresholds related to PUSCH resource selection or 2-step RA are specifically configured or may be omitted for 2-step RA reporting BSR.

67. The method of any of embodiments 51-66 wherein configuring one or more wireless devices in a cell with 2-step RA resources for use in BSR comprises providing a configuration specifying that it is valid only if the wireless device does not have any PUCCH resources for SR transmission.

68. The method of any of embodiments 51-67 wherein configuring one or more wireless devices in a cell with 2-step RA resources for use in BSR comprises providing a configuration wherein the preamble is associated with PUSCH Resource Units (RU) with sizes suitable for BSR transmission but too small to contain an RRC signalling message.

69. The method of embodiment 68 wherein receiving from a wireless device a BSR in a MsgA of a 2-step RA comprises receiving only the BSR, transmitted using a configuration with PUSCH RUs only suitable for BSR transmission.

70. The method of embodiment 68 wherein receiving from a wireless device a BSR in a MsgA of a 2-step RA comprises receiving the BSR together with non-BSR data, transmitted using a configuration with PUSCH RUs large enough for more than BSR transmission.

71. The method of any of embodiments 51-70 wherein receiving from a wireless device a BSR in a MsgA of a 2-step RA comprises receiving the BSR using only a short BSR format.

72. The method of claim 51 wherein the base station is able to determine, from a preamble and PUSCH Resource Unit associated with the received MsgA, that the MsgA transmission contains a BSR, but the base station is unable to decode the full MsgA, and further comprising:
    selecting a size for an uplink data transmission from the wireless device based on one of expected characteristics of the data traffic, an average of prior data traffic, and a preconfigured size; and
    transmitting to the wireless device an uplink grant of the selected size.

73. The method of claim 72 wherein selecting a size for an uplink data transmission and transmitting an uplink grant occur are performed only if the preamble of the received MsgA indicates that the UE has delay sensitive data to transmit.

BB. The method of any of the previous embodiments, further comprising:
    obtaining user data; and
    forwarding the user data to a host computer or a wireless device.

Group C Embodiments

C1. A wireless device configured to perform any of the steps of any of the Group A embodiments.

C2. A wireless device comprising:
    processing circuitry configured to perform any of the steps of any of the Group A embodiments; and
    power supply circuitry configured to supply power to the wireless device.

C3. A wireless device comprising:
    processing circuitry and memory, the memory containing instructions executable by the processing circuitry whereby the wireless device is configured to perform any of the steps of any of the Group A embodiments.

C4. A user equipment (UE) comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:
processing circuitry configured to perform any of the steps of any of the Group B embodiments;
power supply circuitry configured to supply power to the wireless device.

C9. A base station comprising:
processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method of buffer status reporting performed by a wireless device operative in a wireless communication network, the method comprising:
obtaining, from the wireless communication network, one or more configurations specifically for sending a Buffer Status Report (BSR) using a 2-step Random Access (RA) procedure by the one or more configurations defining at least one RACH opportunity as exclusive to the BSR reporting; and
transmitting, to the wireless communication network the BSR, in the MsgA of the 2-step RA;
wherein the one or more configurations is different to a configuration for a MsgA transmission which does not comprise a BSR.

2. The method of claim 1, wherein the method comprises, prior to the transmitting, determining, from a MsgA configuration index, time and frequency domain resources available for the BSR reporting.

3. The method of claim 1, wherein the method comprises, after the transmitting the BSR, monitoring a Physical Downlink Control Channel (PDCCH) to obtain an uplink grant.

4. The method of claim 1, wherein the obtaining comprises obtaining:
a configuration for sending the BSR using the 2-step RA procedure that is specific to a logical channel or a logical channel group;
a configuration specifying which logical channel or logical channel group is used for the BSR;
a configuration that is configured specifically for triggering a transmission of the BSR using the 2-step RA procedure;
a configuration wherein only a subset of Physical Uplink Shared Channel (PUSCH) resources allocated to the 2-step RA MsgA are allocated for the BSR;
a configuration specifying a power ramping step and/or a specific power ramping counter for retransmissions of MsgA PUSCH containing the BSR;
a configuration specifying a maximum number of attempts to transmit the MsgA in the 2-step RA before failure or fallback initiation; or
a configuration specifying one or both of a MsgB window duration and a maximum count of the MsgA retransmissions when no associated MsgB is received within the MsgB window.

5. The method of claim 1, wherein the obtaining comprises obtaining:
a configuration specifying a zero Back-Off indicating immediate retransmission of the MsgA when no associated MsgB is received within a specified MsgB window;
a configuration specifying a prioritized Back-Off indicating a smaller delay for retransmission of the MsgA, when no associated MsgB is received within the specified MsgB window, than for 2-step RA procedures not transmitting BSR;
a configuration specifying a prioritized Back-Off indicating a delay for retransmission of the MsgA, when no associated MsgB is received within the specified MsgB window, wherein the delay is scaled by priority;
a configuration specifying that one or more thresholds related to Physical Uplink Shared Channel (PUSCH) resource selection or the 2-step RA are specifically configured or may be omitted for the 2-step RA reporting the BSR; or
a configuration wherein the preamble is associated with PUSCH Resource Units (RU) with sizes suitable for the BSR transmission but too small to contain an RRC signaling message.

6. The method of claim 1, wherein the obtaining comprises obtaining a configuration wherein only a subset of Physical Uplink Shared Channel (PUSCH) occasion (PO) sets in the time domain are specified to be used for the BSR reporting.

7. The method of claim 6, wherein the PO sets allocated for the BSR reporting, out of all PO sets, are indicated by a bit map signaled by the wireless communication network.

8. The method of claim 1, wherein the obtaining comprises obtaining a configuration specifying that the configuration is valid only when the wireless device does not have any Physical Uplink Control Channel (PUCCH) resources for Scheduling Request (SR) transmission.

9. The method of claim 1, wherein the transmitting comprises:
   transmitting only the BSR, using a configuration with Physical Uplink Shared Channel (PUSCH) Resource Units (RUs) only suitable for BSR transmission; or
   transmitting the BSR together with non-BSR data using a configuration with PUSCH RUs large enough for more than BSR transmission.

10. The method of claim 1, wherein the method comprises, when the transmitted MsgA of the 2-step RA containing the BSR is not received by the wireless communication network, or the wireless device cannot decode a responsive MsgB, performing a Scheduling Request (SR) procedure.

11. The method of claim 1, wherein the method comprises:
   prior to transmitting the BSR in a MsgA, determining that conditions allow a BSR using the 2-step RA procedure; and
   wherein transmitting the BSR in a MsgA comprises transmitting the BSR in a MsgA of a 2-step RA according to the determined conditions.

12. The method of claim 11, wherein the determining that conditions allow the BSR transmission by the 2-step RA comprises:
   determining that no uplink shared channel resource is available for the BSR transmission and a Scheduling Request (SR) is triggered;
   determining that the data received in a buffer exceeds a threshold;
   determining that a logical channel triggering the BSR has no SR configuration;
   determining that a valid Physical Uplink Control Channel (PUCCH) resource is not available before a configured time after SR has been triggered;
   determining that a logical channel or a logical channel group for which the BSR is triggered uses, or is configured to use, the 2-step RA to report the BSR;
   determining that a logical channel or a logical channel group for which the BSR is triggered has a delay metric less than a threshold; or
   determining that a logical channel or a logical channel group for which the BSR is triggered has a priority higher than a configured value.

13. A wireless device operative in a wireless communication network, comprising:
   communication circuitry configured to wirelessly communicate with one or more nodes of the wireless communication network; and
   processing circuitry operatively connected to the communication circuitry, the processing circuitry configured to cause the wireless device to:
      obtain, from the wireless communication network, one or more configurations specifically for sending a Buffer Status Report (BSR) using a 2-step Random Access (RA) procedure by the one or more configurations defining at least one RACH opportunity as exclusive to the BSR reporting, wherein the one or more configurations is different to a configuration for a MsgA transmission which does not comprise the BSR;
      receive data in a buffer; and
      transmit, to the wireless communication network, the BSR in the MsgA of the 2-step RA.

14. A method, performed by a base station operative in a wireless communication network, of receiving a Buffer Status Report (BSR) from a wireless device with low latency, the method comprising:
   configuring one or more wireless devices with one or more configurations in a cell with 2-step Random Access (RA) resources specifically for use in BSR, wherein the one or more configurations is different to a configuration for a MsgA transmission which does not comprise the BSR; and
   receiving, from a wireless device of the one or more wireless devices, the BSR in a MsgA of the 2-step RA.

15. The method of claim 14, wherein the configuring comprises:
   providing a configuration that is specific to a logical channel or a logical channel group;
   providing a configuration that is configured specifically for triggering a transmission of the BSR using the 2-step RA procedure;
   providing a configuration wherein only a subset of Physical Uplink Shared Channel (PUSCH) resources allocated to the 2-step RA MsgA are allocated for BSR;
   providing a configuration specifying one or both of a power ramping step and a specific power ramping counter for retransmissions of MsgA PUSCH containing the BSR;
   providing a configuration specifying a maximum number of attempts to transmit MsgA in the 2-step RA before failure or fallback initiation; or
   providing a configuration specifying one or both of a MsgB window duration and a maximum count of the MsgA retransmissions when no associated MsgB is received within the MsgB window.

16. The method of claim 14, wherein the configuring comprises:
   providing a configuration specifying a zero Back-Off indicating immediate retransmission of the MsgA when no associated MsgB is received within a specified MsgB window;
   providing a configuration specifying a prioritized Back-Off indicating a smaller delay for retransmission of the MsgA, when no associated MsgB is received within a specified MsgB window, than for the 2-step RA procedures not transmitting the BSR;
   providing a configuration specifying a prioritized Back-Off indicating a delay for retransmission of the MsgA, when no associated MsgB is received within a specified MsgB window, wherein the delay is scaled by priority;
   providing a configuration specifying that one or more thresholds related to Physical Uplink Shared Channel (PUSCH) resource selection or 2-step RA are specifically configured or may be omitted for the 2-step RA reporting the BSR; or
   providing a configuration specifying that the configuration is valid only when the wireless device does not have any Physical Uplink Control Channel (PUCCH) resources for Scheduling Request (SR) transmission.

17. The method of claim 14, wherein the configuring comprises providing a configuration wherein only a subset of Physical Uplink Shared Channel (PUSCH) occasion (PO) sets in the time domain are specified to be used for BSR transmission.

18. The method of claim 14, wherein the configuring comprises providing a configuration wherein a preamble is associated with Physical Uplink Shared Channel (PUSCH)

Resource Units (RUs) with sizes suitable for the BSR transmission but too small to contain an RRC signaling message.

19. The method of claim 14:
wherein the base station is able to determine, from a preamble and Physical Uplink Shared Channel (PUSCH) Resource Unit associated with the received MsgA, that the MsgA transmission contains the BSR, but the base station is unable to decode a full MsgA;
wherein the method comprises:
selecting a size for an uplink data transmission from the wireless device based on one of expected characteristics of data traffic, an average of prior data traffic, and a preconfigured size; and
transmitting to the wireless device an uplink grant of the selected size.

20. A base station operative in a wireless communication network, comprising:
communication circuitry configured to wirelessly communicate with one or more wireless devices; and
processing circuitry operatively connected to the communication circuitry, the processing circuitry configured to cause the base station to:
configure one or more wireless devices with one or more configurations in a cell with 2-step Random Access (RA) resources specifically for use in a Buffer Status Report (BSR), wherein the one or more configurations is different to a configuration for a MsgA transmission which does not comprise the BSR; and
receive, from a wireless device of the one or more wireless devices, the BSR in the MsgA of the 2-step RA.

* * * * *